United States Patent

Onoue et al.

(10) Patent No.: US 8,871,368 B2
(45) Date of Patent: Oct. 28, 2014

(54) PERPENDICULAR MAGNETIC RECORDING MEDIUM AND PROCESS FOR MANUFACTURE THEREOF

(75) Inventors: Takahiro Onoue, Singapore (SG); Teiichiro Umezawa, Singapore (SG); Toshiaki Tachibana, Singapore (SG); Masafumi Ishiyama, Singapore (SG)

(73) Assignee: WD Media (Singapore) Pte. Ltd., Singapore (SG)

(*) Notice: Subject to any disclaimer, the term of this patent is extended or adjusted under 35 U.S.C. 154(b) by 277 days.

(21) Appl. No.: 13/119,057

(22) PCT Filed: Sep. 16, 2009

(86) PCT No.: PCT/JP2009/066199
§ 371 (c)(1),
(2), (4) Date: May 5, 2011

(87) PCT Pub. No.: WO2010/032766
PCT Pub. Date: Mar. 25, 2010

(65) Prior Publication Data
US 2011/0212346 A1    Sep. 1, 2011

(30) Foreign Application Priority Data

Sep. 16, 2008  (JP) ................. 2008-236270
Sep. 29, 2008  (JP) ................. 2008-251502
Sep. 29, 2008  (JP) ................. 2008-251503

(51) Int. Cl.
*G11B 5/66* (2006.01)

(52) U.S. Cl.
USPC .......... 428/828.1; 428/829; 428/830

(58) Field of Classification Search
None
See application file for complete search history.

(56) References Cited

U.S. PATENT DOCUMENTS

| | | | | |
|---|---|---|---|---|
| 7,470,474 B2* | 12/2008 | Sakawaki et al. | ............. | 428/829 |
| 7,833,639 B2* | 11/2010 | Sonobe et al. | ............. | 428/826 |
| 7,976,965 B2* | 7/2011 | Shimizu et al. | ............ | 428/828.1 |
| 8,168,310 B2* | 5/2012 | Bian et al. | ..................... | 428/829 |
| 2006/0177703 A1 | 8/2006 | Takenoiri et al. | | |
| 2006/0204791 A1 | 9/2006 | Sakawaki et al. | | |
| 2007/0042227 A1* | 2/2007 | Iwasaki et al. | ................ | 428/832 |

(Continued)

FOREIGN PATENT DOCUMENTS

JP   H10-011734   1/1998
JP   2003-346315  12/2003

(Continued)

OTHER PUBLICATIONS

Japanese Non-Final Office Action dated Oct. 4, 2013, for related Application No. 2009-126734, filed May 26, 2009, pp. 1-9.

(Continued)

*Primary Examiner* — Kevin Bernatz

(57) ABSTRACT

A perpendicular magnetic recording medium with SNR improved by reducing noise due to an auxiliary recording layer so that a higher recording density can be achieved. The perpendicular magnetic recording medium 100 includes a base, at least a magnetic recording layer 122 having a granular structure in which a non-magnetic grain boundary portion is formed between crystal particles grown in a columnar shape; a non-magnetic split layer 124 disposed on the magnetic recording layer 122 and containing Ru and oxygen; and an auxiliary recording layer 126 that is disposed on the split layer 124 and that is magnetically approximately continuous in an in-plane direction of a main surface of the base 110.

13 Claims, 15 Drawing Sheets

(56) References Cited

U.S. PATENT DOCUMENTS

| | | |
|---|---|---|
| 2007/0212574 A1 | 9/2007 | Berger et al. |
| 2008/0292907 A1* | 11/2008 | Berger et al. ................ 428/828 |
| 2009/0073599 A1* | 3/2009 | Nemoto et al. ............ 360/77.02 |

FOREIGN PATENT DOCUMENTS

| | | |
|---|---|---|
| JP | 2004-310910 A | 11/2004 |
| JP | 2006-024346 | 1/2006 |
| JP | 2006-048900 A | 2/2006 |
| JP | 2006-099951 | 4/2006 |
| JP | 2006-114182 | 4/2006 |
| JP | 2007-220177 | 8/2007 |
| JP | 2007-317255 | 12/2007 |
| JP | 2008-065879 A | 3/2008 |
| JP | 2009-238274 A | 10/2009 |

OTHER PUBLICATIONS

T. Oikawa et al, "Microstructure and Magnetic Properties of CoPtCr-SiO2 Perpendicular Recording Media", IEEE Trans. Magn., vol. 38, 2002, p. 1.

* cited by examiner

COMPOSITIONS BETWEEN NON-MAGNETIC LAYERS OF EXAMPLES AND COMPARATIVE EXAMPLES

| | | Hc | Hn | SNR |
|---|---|---|---|---|
| EXAMPLE 1 | Ru-WO3 | 5058 | -2733 | 17.8 |
| EXAMPLE 2 | Ru-SiO2 | 4941 | -2648 | 17.4 |
| EXAMPLE 3 | Ru+O2 EXPOSURE | 4750 | -2250 | 17.4 |
| COMPARATIVE EXAMPLE 1 | NO NON-MAGNETIC LAYER | 5531 | -3071 | 16.5 |
| COMPARATIVE EXAMPLE 2 | Ru ONLY | 4930 | -2470 | 17 |
| COMPARATIVE EXAMPLE 3 | O2 EXPOSURE ONLY | 5510 | -3020 | 16.5 |

COMPOSITIONS BETWEEN NON-MAGNETIC LAYERS OF EXAMPLES AND COMPARATIVE EXAMPLES

FIG. 4
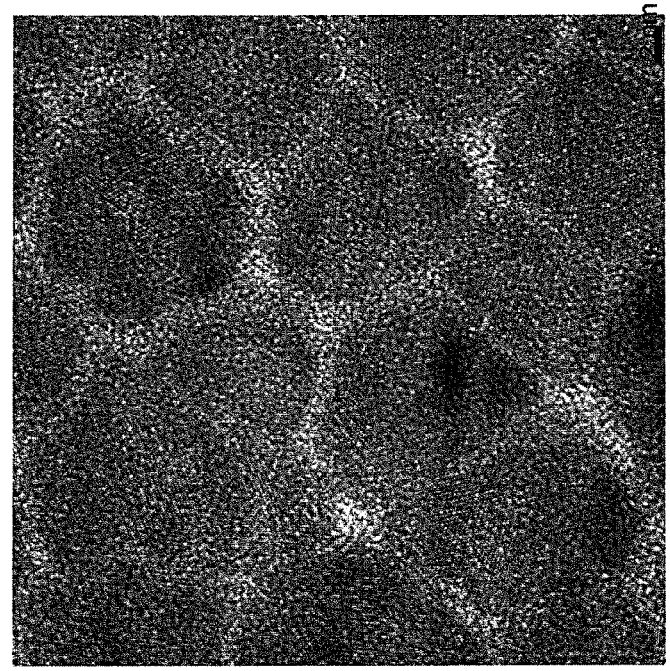
COMPARATIVE EXAMPLE1
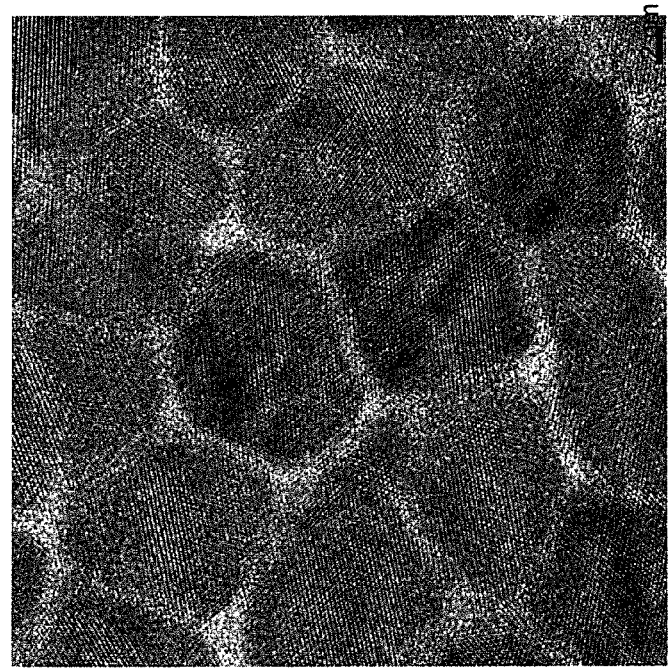
EXAMPLE1

FIG. 5A
|  | Pt CONTENT OF THE FIRST MAGNETIC RECORDING LAYER[at%] | Pt CONTENT OF THE SECOND MAGNETIC RECORDING LAYER[at%] | Hc [Oe] | SN [dB] |
|---|---|---|---|---|
| LINE 1 (Pt CONTENT OF FIRST MAGNETIC RECORDING LAYER IS FIXED) | 18 | 12 | 4235 | 17.7 |
|  | 18 | 14 | 4744 | 17.8 |
|  | 18 | 16 | 5058 | 17.8 |
|  | 18 | 17 | 4976 | 17.9 |
|  | 18 | 18 | 4877 | 17.9 |
|  | 18 | 20 | 4794 | 17.4 |
| LINE 2 (Pt CONTENT OF SECOND MAGNETIC RECORDING LAYER IS FIXED) | 14 | 16 | 4357 | 17.5 |
|  | 16 | 16 | 4712 | 17.7 |
|  | 18 | 16 | 5058 | 17.8 |
|  | 20 | 16 | 4811 | 17.7 |
|  | 22 | 16 | 4721 | 17.7 |
|  | 24 | 16 | 4637 | 17.5 |
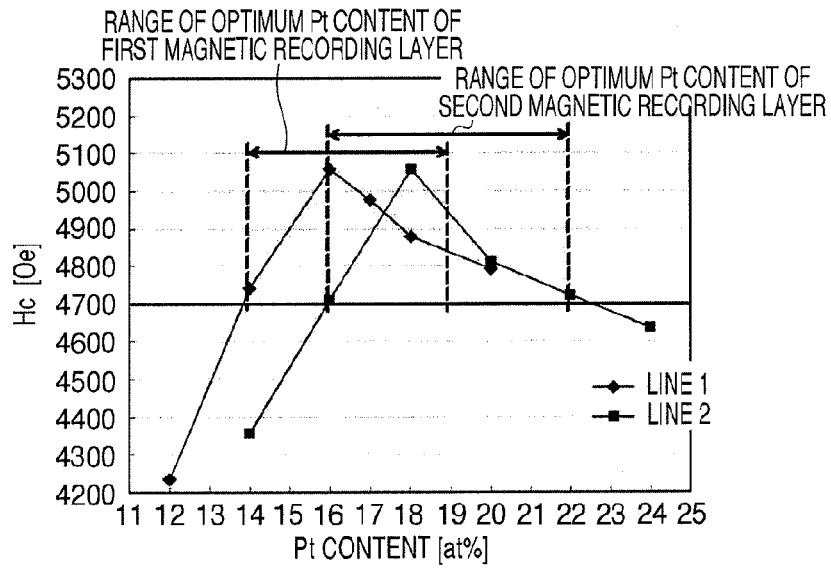
FIG. 5B
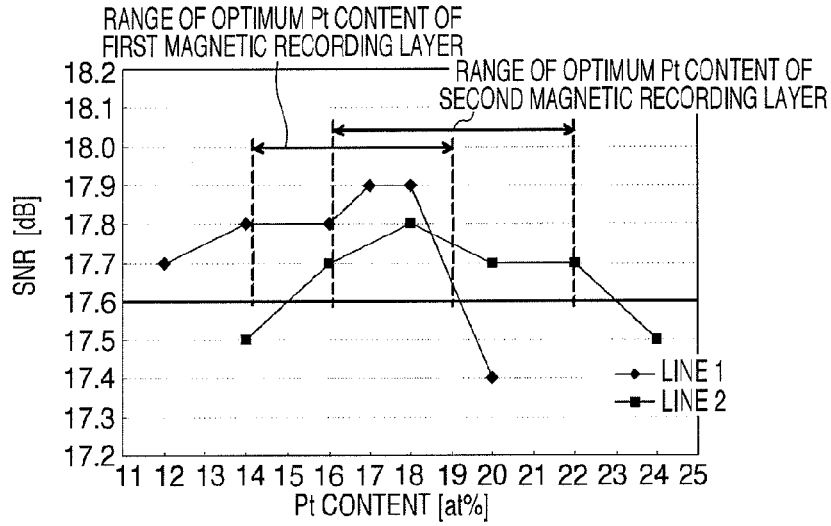
FIG. 5C

| | FILM THICKNESS [nm] | | RATIO [%] | Hc [Oe] | SN [dB] |
|---|---|---|---|---|---|
| | B-Mag | T-Mag | | | |
| LINE 3 | 4.1 | 9.5 | 43.2 | 5710 | 17.0 |
| | 3.6 | 9.5 | 37.9 | 5520 | 17.4 |
| | 3.0 | 9.5 | 31.6 | 5205 | 17.7 |
| | 2.1 | 9.5 | 22.1 | 5080 | 17.8 |
| | 2.1 | 11.0 | 19.1 | 5300 | 17.6 |
| | 1.7 | 11.0 | 15.5 | 4980 | 17.8 |
| | 1.3 | 11.0 | 11.8 | 4320 | 18.2 |

RATIO OF FILM THICKNESSES OF FIRST MAGNETIC RECORDING LAYER TO SECOND MAGNETIC RECORDING LAYER [%]
(FIRST MAGNETIC RECORDING LAYER / SECOND MAGNETIC RECORDING LAYER)

FIG. 8

| | MATERIAL OF SPLIT LAYER | MATERIAL OF SECOND SPLIT LAYER | Hc | Hn | SNR |
|---|---|---|---|---|---|
| EXAMPLE 11 | RuCo50 | - | 5186 | -2840 | 14.2 |
| EXAMPLE 12 | RuCo50 | RuCo50 | 4886 | -2638 | 15.0 |
| EXAMPLE 13 | RuW03 | - | 5140 | -2800 | 13.9 |
| EXAMPLE 14 | RuCo50 | RuCo40 | 4848 | -2601 | 15.1 |
| EXAMPLE 15 | RuCo50 | RuCo60 | 4932 | -2669 | 14.9 |
| COMPARATIVE EXAMPLE 11 | Ru | - | 4720 | -2200 | 12.1 |

FIG. 9

| FILM THICKNESS OF SECOND SPLIT LAYER [nm] | SNR [dB] |
|---|---|
| 0.0 | 14.6 |
| 0.2 | 15.0 |
| 0.4 | 15.2 |
| 0.6 | 15.3 |
| 0.8 | 15.4 |
| 1.0 | 15.3 |

FIG. 13

| ITEM | N/C | Dh/Gh | SUBSTRATE TEMPERATURE | SURFACE TREATMENT | FILM THICKNESS OF PROTECTIVE LAYER OF MEDIUM | L/UL DURABILITY TEST | PIN-ON-DISK TEST | HIGH FLY WRITE TEST |
|---|---|---|---|---|---|---|---|---|
| CONDITION | 0.05~0.150 | 0.7~0.95 | 250~350°C | 100~350 scc | ~3nm | | 300~ | |
| EXAMPLE 21 | 0.107 | 0.80 | 300 | 250 | 3.0 | 1,000,000 OR MORE | 501 | NO ERROR |
| EXAMPLE 22 | 0.101 | 0.79 | 275 | 250 | 3.0 | 1,000,000 OR MORE | 533 | NO ERROR |
| EXAMPLE 23 | 0.095 | 0.77 | 250 | 250 | 3.0 | 1,000,000 OR MORE | 563 | NO ERROR |
| EXAMPLE 24 | 0.112 | 0.84 | 325 | 250 | 3.0 | 1,000,000 OR MORE | 476 | NO ERROR |
| EXAMPLE 25 | 0.120 | 0.86 | 350 | 250 | 3.0 | 1,000,000 OR MORE | 448 | NO ERROR |
| EXAMPLE 26 | 0.150 | 0.95 | 350 | 350 | 3.0 | 1,000,000 OR MORE | 322 | NO ERROR |
| EXAMPLE 27 | 0.092 | 0.79 | 300 | 200 | 3.0 | 1,000,000 OR MORE | 569 | NO ERROR |
| EXAMPLE 28 | 0.073 | 0.72 | 300 | 150 | 3.0 | 1,000,000 OR MORE | 624 | NO ERROR |
| EXAMPLE 29 | 0.122 | 0.85 | 300 | 300 | 3.0 | 1,000,000 OR MORE | 445 | NO ERROR |
| EXAMPLE 30 | 0.134 | 0.90 | 300 | 350 | 3.0 | 1,000,000 OR MORE | 392 | NO ERROR |
| EXAMPLE 31 | 0.050 | 0.70 | 250 | 100 | 3.0 | 1,000,000 OR MORE | 684 | NO ERROR |
| EXAMPLE 32 | 0.115 | 0.87 | 250 | 350 | 3.0 | 1,000,000 OR MORE | 450 | NO ERROR |
| EXAMPLE 33 | 0.058 | 0.72 | 350 | 100 | 3.0 | 1,000,000 OR MORE | 649 | NO ERROR |
| COMPARATIVE EXAMPLE 21 | 0.045 | 0.65 | 250 | 90 | 3.0 | 1,000,000 OR MORE | 703 | ERROR OCCURRED AFTER 12 HRS. |
| COMPARATIVE EXAMPLE 22 | 0.155 | 0.88 | 250 | 360 | 3.0 | CRASHED AT 300,000 OPERATIONS | 298 | NO ERROR |
| COMPARATIVE EXAMPLE 23 | 0.052 | 0.67 | 350 | 90 | 3.0 | 1,000,000 OR MORE | 678 | ERROR OCCURRED AFTER 24 HRS. |
| COMPARATIVE EXAMPLE 24 | 0.162 | 1.02 | 350 | 360 | 3.0 | CRASHED AT 100,000 OPERATIONS | 235 | NO ERROR |
| COMPARATIVE EXAMPLE 25 | 0.048 | 0.65 | 240 | 100 | 3.0 | 1,000,000 OR MORE | 695 | ERROR OCCURRED AFTER 12 HRS. |
| COMPARATIVE EXAMPLE 26 | 0.049 | 0.69 | 360 | 100 | 3.0 | 1,000,000 OR MORE | 688 | ERROR OCCURRED AFTER 24 HRS. |
| COMPARATIVE EXAMPLE 27 | 0.151 | 0.82 | 240 | 350 | 3.0 | CRASHED AT 500,000 OPERATIONS | 352 | ERROR OCCURRED AFTER 38 HRS. |
| COMPARATIVE EXAMPLE 28 | 0.153 | 0.99 | 360 | 350 | 3.0 | CRASHED AT 200,000 OPERATIONS | 277 | NO ERROR |

PERPENDICULAR MAGNETIC RECORDING MEDIUM AND PROCESS FOR MANUFACTURE THEREOF

CROSS REFERENCE TO RELATED APPLICATIONS

This application is a National Stage of International Application No. PCT/JP2009/066199 filed Sep. 16, 2009, claiming priority based on Japanese Patent Application Nos. 2008-236270, filed Sep. 16, 2008, 2008-251502, filed Sep. 29, 2008, and 2008-251503 filed Sep. 29, 2008, the contents of all of which are incorporated herein by reference in their entirety.

TECHNICAL FIELD

The present invention relates to a perpendicular magnetic recording medium to be mounted on an HDD (hard disk drive) or the like of a perpendicular magnetic recording type, and a method of manufacturing the same.

BACKGROUND ART

With an increase in capacity of information processing in recent years, various information recording technologies have been developed. In particular, the surface recording density of an HDD using a magnetic recording technology is continuously increasing at an annual rate of approximately 100%. In recent years, an information recording capacity exceeding 200 gigabytes per perpendicular magnetic recording medium with a 2.5-inch diameter for use in an HOD or the like has been demanded. To fulfill such a demand, an information recording density exceeding 400 gigabits per square inch is desired to be achieved.

To achieve a high recording density in a magnetic recording medium for use in an HDD or the like, a perpendicular magnetic recording type has been proposed in recent years. In a perpendicular magnetic recording medium for use in the perpendicular magnetic recording type, the axis of easy magnetization of a magnetic recording layer is adjusted so as to be oriented in a direction perpendicular to the base surface. In the perpendicular magnetic recording type, compared with a conventional in-plane recording type, it is possible to more suppress a so-called thermal fluctuation phenomenon, in which thermal stability of a recording signal is impaired because of a superparamagnetic phenomenon to cause the recording signal to be lost, and therefore the perpendicular magnetic recording type is suitable for increasing the recording density.

As a magnetic recording medium for use in the perpendicular magnetic recording type, a CoCrPt—$SiO_2$ perpendicular magnetic recording medium (refer to Non-Patent Document 1) has been proposed because of high thermal stability and excellent recording characteristic. This is to configure a granular structure in a magnetic recording layer in which a non-magnetic grain boundary part with segregation of $SiO_2$ is formed between magnetic particles in which a crystal with an hcp structure (a hexagonal close-packed crystal lattice) of Co continuously grows in a columnar shape, thereby achieving finer magnetic particles and an improvement of a coercive force Hc together. It is known that an oxide is used for the non-magnetic grain boundary (a non-magnetic portion between magnetic particles), and, for example, using any one of $SiO_2$, $Cr_2O_3$, TiO, $TiO_2$, and $Ta_2O_5$ has been proposed (Patent Document 1).

However, when an intense magnetic field is applied to the magnetic recording layer, leak field to an adjacent track becomes large, so that WATE (wide Area Track Erasure), namely, a phenomenon, that recorded information within the range of several micrometers from a track to write on is lost, is problematic. As means for reducing WATE, it is important to set a reversed magnetic domain nucleation field Hn of the magnetic recording layer at a negative value, and increase the absolute value thereof. In order to obtain a high (large in absolute value) Hn, a CGC (Coupled Granular Continuous) medium in which a thin film having a high perpendicular magnetic anisotropy is formed above or below the magnetic recording layer having a granular structure was devised (Patent Document 2).

Generally, as the coercive force Hc of the magnetic recording layer is more improved, a higher recording density can be achieved but writing by the magnetic head tends to be more difficult. Then, an auxiliary recording layer improves saturated magnetization Ms and also contributes to improving easy writing, namely, an overwrite characteristic. In other words, objects of disposing the auxiliary recording layer on the magnetic recording layer are to improve the reversed magnetic domain nucleation filed Hn to reduce noise, and to improve the saturated magnetization Ms to improve the overwrite characteristic. Note that the auxiliary recording layer may be referred to as a continuous layer or cap layer.

With such increase in information recording density, both a line recording density in a circumferential direction (BPI: Bit Per Inch) and a track recording density in a radial direction (TPI: Track Per Inch) keep increasing. Furthermore, a technique of reducing a space (magnetic spacing) between the magnetic layer of the magnetic disk and a recording and reproducing device of the magnetic head to improve an S/N ratio is also considered. The flying height of the magnetic head that has been desired in recent years is 10 nm or less.

As a technique for reducing magnetic spacing such as described above, there has been proposed a DFH (Dynamic Flying Height) head that causes a magnetic head element to generate heat during operation of the magnetic head element and causes the heat to thermally expand the magnetic head, thereby projecting the magnetic head slightly in the direction of an ABS (The air bearing surface). This makes it possible to adjust the space between the magnetic head and the magnetic disk so that the magnetic head can fly with the magnetic spacing kept stable and narrow.

The perpendicular magnetic recording disk is provided with a protective layer that protects the surface of the magnetic recording layer from being damaged when the magnetic head hits the perpendicular magnetic recording disk. The protective layer forms a coating film with a high hardness by a carbon overcoat (COD), namely, a carbon coating film. The protective layer may be a layer made of hard diamond-like (amorphous) carbon and soft graphite carbon in a mixing manner (for example, Patent Document 3). A technique of manufacturing a diamond-like carbon protective layer by CVD (Chemical Vapor Deposition) method has also been disclosed (for example, Patent Document 4).

On the protective layer, a lubricating layer is also formed to protect the protective layer and the magnetic head when the magnetic head hits the disk. The lubricating layer is formed, for example, by applying perfluoro polyether and sintering the same.

PRIOR ART DOCUMENT

Patent Document

[Patent Document 1] Japanese Unexamined Patent Application Publication No. 2006-024346
[Patent Document 2] Japanese Unexamined Patent Application Publication No. 2003-346315
[Patent Document 3] Japanese Unexamined Patent Application Publication No. H10-011734
[Patent Document 4] Japanese Unexamined Patent Application Publication No. 2006-114182

Non-Patent Document

[Non-Patent Document 1] T. Oikawa et. al., IEEE Trans. Magn., vol. 38, 1976-1978 (2002)

DISCLOSURE OF INVENTION

Problems to be Solved by the Invention

In the magnetic recording medium with such increased recording density as described above, a further improvement in recording density is demanded for the future. Important factors for increasing recording density of the perpendicular magnetic recording medium include an improvement in magnetostatic characteristic, such as a coercive force Hc and a reversed magnetic domain nucleation magnetic field Hc; and an improvement in electromagnetic conversion characteristic, such as an overwrite characteristic (OW characteristic), an SNR (Signal to Noise Ratio), and narrowing of a track width. Of them, the improvement in coercive force Hc and the improvement in SNR are important for reading and writing accurately at high speed even at a recording bit of a small area.

The improvement in SNR is achieved mainly by reducing noise in a magnetization transition region of the magnetic recording layer. Effective factors for reducing noise include an improvement in crystalline orientation of the magnetic recording layer, making particle diameters of magnetic particles finer, and isolation of the magnetic particles. Of them, when isolation of magnetic particles is promoted, magnetic interaction between adjacent magnetic particles is interrupted. Therefore, noise can be greatly reduced and the SNR can be significantly improved. In the perpendicular magnetic recording medium of the above granular structure, magnetic particles are isolated and refined by using an oxide to form a grain boundary, thereby improving the SNR.

However, the auxiliary recording layer described above does not have a granular structure but has a structure that is magnetically approximately continuous in an in-plane direction. This makes it possible for the auxiliary recording layer to improve the overwrite characteristic but causes increase in noise. In particular, the auxiliary recording layer is positioned at an upper portion of the medium, and therefore has a large effect on the increase in noise. However, without the auxiliary recording layer, the OW characteristic enormously lowers, and a recent magnetic recording layer having a high coercive force can no longer be written. This makes it inevitable to allow a certain amount of noise.

Therefore, it is difficult to use the above techniques to achieve further improvement in SNR, and accordingly, in order to achieve a higher recording density of the magnetic recording medium, the issue is the establishment of a new technique that makes it possible to achieve further improvement in SNR of the magnetic recording layer.

In consideration of this issue, an object of the present invention is to provide a perpendicular magnetic recording medium the SNR of which is improved by reducing noise thought to be due to the auxiliary recording layer so that a higher recording density can be achieved.

Furthermore, in order to achieve such magnetic spacing as described above, for example, magnetic spacing of 10 nm or less, the protective layer of the perpendicular magnetic recording disk is required to be as thin as 3 nm or less. However, simply thinning the protective layer causes degradation of durability such as abrasion resistance or impact resistance.

Various methods of forming a protective layer are conventionally known, but the protective layers conventionally known do not have sufficient durability, and therefore, in an LUL (Load Unload) type perpendicular magnetic recording disk device, an impact applied by loading the magnetic recording head onto the perpendicular magnetic recording disk makes a slight scratch or the like on the perpendicular magnetic recording disk, which is causing the problem that a reproducing signal is lowered.

Even in the case where the DFH head described above is used, when a fixing force of the lubricating layer is weak, the lubricating layer may stick to the magnetic head at a contacting time of the magnetic head with the magnetic disk. Thereby, the magnetic head covered with the lubricating layer may cause a read and write failure, or may cause the magnetic head to fly unstably to cause a high fly write phenomenon. The high fly write phenomenon is a phenomenon that separation of the magnetic head from the magnetic disk results in failure to write data, which should be written, and thus a read error occurs even if there is not necessarily wrong with hardware.

Here, the carbon protective layer formed by CVD is known to be able to form a dense and hard coating film by elevating a substrate temperature. Therefore, in a conventional in-plane recording type magnetic disk, a process of heating before forming the protective layer is often employed. However, in the perpendicular magnetic recording medium, heating causes significant degradation of such a characteristic as coercive force Hc, and therefore the heating process cannot be employed, which makes it difficult to obtain the protective layer having desired hardness. Here, it is unknown at present which layer of the perpendicular magnetic recording type is damaged by heating.

Therefore, in addition to the above object, another object of the present invention is to provide a perpendicular magnetic recording medium and a method of manufacturing the same in which such durability as abrasion resistance and impact resistance of the protective layer is improved so that such problems as scratching can be avoided even if the film thickness of the protective layer is limited to 3 nm or less.

Means for Solving the Problems

In order to solve the above problems, the inventors have conducted careful examination and have focused on the point that the magnetic recording layer and the auxiliary recording layer have extremely different structures. That is, the magnetic recording layer has a granular structure, while the auxiliary recording layer has a film structure that is uniform in an in-plane direction of the film. This has given the inventors a thought that the fine structure of the auxiliary recording layer may be affected by forming the auxiliary recording layer on the magnetic recording layer. Then, the inventors have accumulated their further studies, and have found that the above problems are solved by interposing a non-magnetic split layer containing RU and oxygen between the magnetic recording layer and the auxiliary recording layer to achieve reduction of noise, and have reached completion of the present invention.

That is, in order to solve the above problems, a representative configuration of a perpendicular magnetic recording medium according to the present invention is characterized by including, on a base, at least a magnetic recording layer having a granular structure in which a non-magnetic grain boundary portion is formed between crystal particles grown in a columnar shape; a non-magnetic split layer disposed on the magnetic recording layer and containing Ru and oxygen; and an auxiliary recording layer that is disposed on the split layer and that is magnetically approximately continuous in an in-plane direction of a main surface of the base.

According to the above configuration, the noise thought to be due to the auxiliary recording layer can be reduced to improve the SNR. It is supposed that such a fact is because the split layer containing Ru and oxygen and disposed between the magnetic recording layer and the auxiliary recording layer adjusts exchange coupling between the magnetic recording layer and the auxiliary recording layer moderately. Furthermore, the split layer containing oxygen has a high affinity for an oxide composing the grain boundary of the magnetic recording layer, and oxygen atoms in the split layer deposit and segregate selectively on the grain boundary. This promotes separation of the auxiliary recording layer, resulting in suppression of the noise due to the auxiliary recording layer. Furthermore, Ru has the effect of improving the crystal orientation of Co in the auxiliary recording layer overall.

Another representative configuration of a perpendicular magnetic recording medium according to the present invention is characterized by including, on a base, in the following order, at least a first magnetic recording layer having a granular structure in which a non-magnetic grain boundary portion is formed between magnetic particles grown continuously in a columnar shape; a second magnetic recording layer having a granular structure in which a non-magnetic grain boundary portion is formed between magnetic particles grown continuously in a columnar shape; a non-magnetic split layer; and an auxiliary recording layer magnetically approximately continuous in an in-plane direction of a main surface of the base, wherein the first magnetic recording layer and the second magnetic recording layer are Co alloys containing Pt, and the Pt content of the second magnetic recording layer is lower than that of the first magnetic recording layer.

According to the above configuration, the noise thought to be due to the auxiliary recording layer can be reduced to improve the SNR. It is supposed that such a fact is because the non-magnetic split layer disposed between the magnetic recording layer and the auxiliary recording layer adjusts exchange coupling between the magnetic recording layer and the auxiliary recording layer moderately. On the other hand, the non-magnetic split layer causes reduction in coercive force, but, since the Pt content of the second magnetic recording layer is lower than that of the first magnetic recording layer, the coercive force can be improved in the first magnetic recording layer due to a higher Pt content therein, while a high SNR is secured in the second magnetic recording layer that is a main recording layer. Therefore, overall, it becomes possible to obtain both a high SNR and coercive force.

As a specific means for causing the split layer to contain Ru and oxygen, the split layer can be composed of RU and an oxide. By sputtering using a target containing RU and an oxide, oxygen dissociated from the oxide is caused to be contained in the film, which results in achievement of a similar effect to oxygen addition.

The oxide may be $WO_3$, $TiO_2$, or RuO. There are various possible oxides, but in particular use of oxides of W (tungsten), Ti (titanium), Ru (ruthenium) can improve an electromagnetic conversion characteristic (SNR). Among them, $WO_3$ can obtain a high effect. This is because $WO_3$ is an unstable oxide, and therefore $WO_3$ dissociates a lot of oxygen during sputtering, and exhibits the effect of oxygen addition more effectively.

The split layer may have a film thickness of 2 Å to 10 Å (0.2 nm to 1 nm). If the film thickness of the split layer is 10 Å or more, the magnetic recording layer and the auxiliary recording layer are magnetically completely discontinued, and therefore a desired SNR cannot be obtained. On the other hand, if the film thickness is 2 Å or less, the split layer cannot form a coating film. Note that, here, the coating film is not necessarily continuous, for example, the film may deposit in an island shape as long as it can fulfill its function.

The magnetic recording layer may include two or more kinds of oxides. This makes it possible to obtain characteristics of a plurality of oxides, and therefore it becomes possible to obtain a perpendicular magnetic recording medium that achieves further refinement and isolation of the magnetic particles in the magnetic recording layer to reduce noise and improve the SNR so that a high recording density is achieved.

The magnetic recording layer may include $SiO_2$ and $TiO_2$ as the oxides. $SiO_2$ has a characteristic of promoting refinement and isolation of magnetic particles, and $TiO_2$ has a characteristic of improving an electromagnetic conversion characteristic (particularly, SNR). By causing these oxides in combination to segregate to the grain boundary of the magnetic recording layer, both their advantages can be gained.

The magnetic recording layer may include 5 mol % or more of oxide constituting a grain boundary portion. This is because, when 5 mol % or more of oxide is included, high magnetostatic characteristic and electromagnetic conversion characteristic can be obtained, and, though the characteristic of the auxiliary recording layer becomes too small to ignore when the oxide is in such a range, the characteristic can be improved by providing the above split layer.

The Pt content in the first magnetic recording layer may be 16 at % to 22 at %. The Pt content within such a range can improve the coercive force positively.

The Pt content in the second magnetic recording layer may be 14 at % to 19 at %. The Pt content within such a range makes it possible for Cr to suppress noise due to Pt, and therefore a high SNR can be secured.

When the thickness of the first magnetic recording layer is represented by A nm, and the thickness of the second magnetic recording layer is represented by B nm, A/B may be 15% to 30%. Thinning the first magnetic recording layer to such an extent as described above makes it possible to suppress an influence from noise increased by an increase in Pt. Note that it is preferred that the thickness of the first magnetic recording layer is in the range of 1.7 nm to 3.2 nm, and the thickness of the second magnetic recording layer is in the range of 8.5 nm to 11.0 nm. This makes it possible to achieve both moderate coercive force Hc and SNR.

Note that the auxiliary recording layer may contain 14 at % to 20 at % of Cr. This makes it possible to increase the saturation magnetization Ms of the auxiliary recording layer and achieve noise reduction. Even if the auxiliary recording layer contains such a large amount of Cr, providing the non-magnetic split layer prevents the Cr in the auxiliary recording layer from diffusing in the magnetic recording layer, and therefore reduction in characteristic is not caused.

Another representative configuration of a perpendicular magnetic recording medium according to the present invention is characterized by including, on a base, in the following order, at least a first magnetic recording layer having a granular structure in which a non-magnetic grain boundary portion is formed between crystal particles grown in a columnar shape; a second magnetic recording layer having a granular structure in which a non-magnetic grain boundary portion is formed between crystal particles grown in a columnar shape; a second split layer that is disposed on the second magnetic recording layer and that contains a Ru alloy as a main component; a third magnetic recording layer having a granular structure in which a non-magnetic grain boundary portion is formed between crystal particles grown in a columnar shape; a split layer that is disposed on the third magnetic recording layer and that contains a Ru alloy as a main component; and an auxiliary recording layer that is disposed on the split layer and that is magnetically approximately continuous in an in-plane direction of a main surface of the base.

According to the above configuration, the noise thought to be due to the auxiliary recording layer can be reduced to improve the SNR. That is, not only in a case where the composition of the split layer includes Ru and oxygen, but also in a case where the compositions is a Ru alloy, the SNR can be improved similarly. Here, the Ru alloy means a metal obtained by adding to Ru another metal element or an oxide. In particular, RuCo, $RuWO_3$, $RuTiO_2$, RuO, or the like can be involved. An Ru alloy may not necessarily be non-magnetic, but it may be slightly magnetized.

Since the second split layer is disposed immediately below the third magnetic recording layer having a granular structure, separation of the crystal particles in the third magnetic recording layer can be promoted. This makes it possible to improve the SNR, so that a higher recording density can be achieved.

Another representative configuration of a perpendicular magnetic recording medium according to the present invention is characterized by including, on a base, at least a magnetic recording layer having a granular structure in which a non-magnetic grain boundary portion is formed between crystal particles grown in a columnar shape; a non-magnetic split layer provided as an upper layer of the magnetic recording layer; an auxiliary recording layer that is provided as an upper layer of the split layer and that is magnetically approximately continuous in an in-plane direction of a main surface of the base; a protective layer that is provided as an upper layer of the auxiliary recording layer and that contains carbon as a main component; and a lubricating layer disposed on the protective layer, wherein, when the protective layer is excited by an argon ion laser with a wavelength of 514.5 nm to measure a Raman spectrum, fluorescent background in the range of wave number of 900 $cm^{-1}$ to 1800 $cm^{-1}$ of the Raman spectrum is corrected by linear approximation, and a D peak that appears at around 1350 $cm^{-1}$ and a G peak that appears at around 1520 $cm^{-1}$ are subjected to waveform separation by Gaussian function, the ratio of D peak height (Dh) to G peak height (Gh) is in a range from 0.70 to 0.95.

By disposing the split layer between the magnetic recording layer and the auxiliary recording layer in this manner, reduction in coercive force Hc due to heating before forming the protective layer can be prevented. That is, providing the split layer makes it possible to obtain a peak ratio Dh/Gh of 0.70 to 0.95 of the Raman spectrum, so that durability, such as impact resistance, abrasion resistance, and corrosion resistance, can be improved.

The magnetic recording layer and the auxiliary recording layer may be Co alloys containing Cr. Such a configuration makes it possible to obtain magnetic films having high perpendicular magnetic anisotropy as the magnetic recording layer and the auxiliary recording layer. Therefore, it is possible to improve the high density recording property and low noise property of the magnetic recording layer. Furthermore, since the auxiliary recording layer is disposed above the magnetic recording layer, the perpendicular magnetic recording medium can also be given high resistance to heat fluctuation.

Here, it is thought that the reason why the coercive force is reduced by heating before forming the protective layer if the split layer is not provided is that Cr contained in the auxiliary recording layer diffuses in the magnetic recording layer, which results in reduction in crystal orientation of the magnetic particles. On the other hand, it is thought that the reason why providing the split layer like the above configuration makes it possible to decrease lowering in coercive force is that the split layer can prevent diffusion of Cr. That is, providing the split layer makes it possible to maintain the coercive force even if heating to high temperature is performed, and to form the protective layer that is dense and has high hardness as described above.

The split layer may be made of Ru or a Ru alloy. This is because Ru has a crystalline form (hcp) similar to Co composing the magnetic particles, and therefore Ru is unlikely to disturb epitaxial growth of Co crystal particles even if the split layer is interposed between the magnetic layers.

The split layer may also be made of Ru or a Ru alloy containing W (tungsten). By causing W to be contained, in particular, a reduction in coercive force Hc during heating at a high temperature is made small. It is thought that such a fact is because W is a high-melting-point material, and therefore the crystalline structure thereof is difficult to collapse even by heating, and diffusion of Cr between the auxiliary recording layer and the magnetic recording layer can be prevented. Note that W may be contained in the form of an oxide.

It is preferred that the split layer contain no Cr. This is because, when the split layer contains Cr, reduction in coercive force Hc due to heating can be seen. It is thought that such a fact is because Cr in the split layer diffuses in the magnetic recording layer to affect the crystalline orientation.

The protective layer may be a carbon-based coating film containing nitrogen, the ratio of atomic weight of nitrogen to carbon (N/C) in a topmost surface of which ranges from 0.050 to 0.150. In this manner, setting the ratio of atomic weight of nitrogen to carbon (N/C) in the range of 0.050 to 0.150 makes it possible to increase the ratio of adhesion to the lubricating layer, so that a high fly write problem or a crash against the magnetic head can be avoided.

A representative configuration of a method of manufacturing a perpendicular magnetic recording medium according to the present invention is characterized by forming, on a base, a magnetic recording layer having a granular structure in which a non-magnetic grain boundary portion is formed between crystal particles grown in a columnar shape; forming a non-magnetic split layer as an upper layer of the magnetic recording layer; forming an auxiliary recording layer magnetically approximately continuous in an in-plane direction of a main surface of the base, as an upper layer of the split layer; heating the perpendicular magnetic recording medium such that, when a protective layer, which is formed later, is excited by an argon ion laser with a wavelength of 514.5 nm to measure a Raman spectrum, fluorescent background in the range of wave number of 900 $cm^{-1}$ to 1800 $cm^{-1}$ of the Raman spectrum is corrected by linear approximation, and a D peak that appears at around 1350 $cm^{-1}$ and a G peak that appears at around 1520 $cm^{-1}$ are subjected to waveform separation by Gaussian function, the ratio of D peak height (Dh) to G peak height (Gh) is in a range from 0.70 to 0.95; and forming the protective layer by CVD.

As described above, by providing the non-magnetic split layer between the magnetic recording layer and the auxiliary recording layer, and heating the perpendicular magnetic recording medium before forming the protective layer, durability of the protective layer, such as impact resistance, abrasion resistance, and corrosion resistance, can be improved while a high coercive force Hc is kept.

The heating may be performed at a temperature in the range of 250° C. to 350° C. When a heating process is performed immediately before forming the protective layer, carbon atoms decomposed by plasma can reach the substrate, keeping high energy. These carbon atoms keeping high energy form a film on the substrate on the magnetic recording layer, and thus the protective layer that is dense and durable can be formed. Furthermore, by heating the auxiliary recording layer at a high temperature, adhesion between the magnetic layer and the protective layer can also be improved.

After forming the protective layer, by further exposing the protective layer to nitrogen atmosphere at a flow rate of 100 sccm to 350 sccm, a process may be performed such that the ratio (N/C) of atomic weight of nitrogen (N) to carbon (C) on the surface of the protective layer is in a range from 0.050 to 0.150. By exposing the protective layer to nitrogen atmosphere at a flow rate of 100 to 350 sccm, the ratio (N/C) of atomic weight of nitrogen (N) to carbon (C) can be put in a range from 0.050 to 0.150, and an adhesion of the protective layer to the lubricating layer and a hardness thereof can be made suitable.

Furthermore, the lubricating layer containing a perfluoro polyether compound having a hydroxyl group as a terminal group may be formed. Perfluoro polyether has a straight-chain structure, and it provides a moderate lubrication performance for the perpendicular magnetic recording medium, and can provide high adhesion to the protective layer because it has the hydroxyl (OH) as the terminal group. Particularly in the configuration of the present invention provided with a surface treatment layer containing nitrogen on the surface of the protective layer, ($N^+$) and ($OH^-$) have a high affinity for each other, and therefore the lubricating layer can obtain a high adhesion rate.

According to the present invention, it is possible to provide a perpendicular magnetic recording medium, the SNR of which is improved by reducing noise thought to be due to the auxiliary recording layer so that a higher recording density can be achieved, and to provide a method of manufacturing the same.

BRIEF DESCRIPTION OF DRAWINGS

FIG. 4 shows TEM photographs of auxiliary recording layers of an example and a comparative example.

FIGS. 5A to 5C are a table and graphs, for describing results when an amount of Pt in a magnetic recording layer in a second embodiment was varied.

FIG. 8 is a table for describing comparisons between a split layer and presence/absence of a second split layer and between materials of the split layer and the second split layer.

FIG. 9 is a table for describing the relationship between film thickness and SNR of a split layer and a second split layer.

FIG. 13 is an explanation table showing parameters and effectiveness of examples and comparative examples.

DESCRIPTION OF REFERENCE NUMERALS

Figure 1:
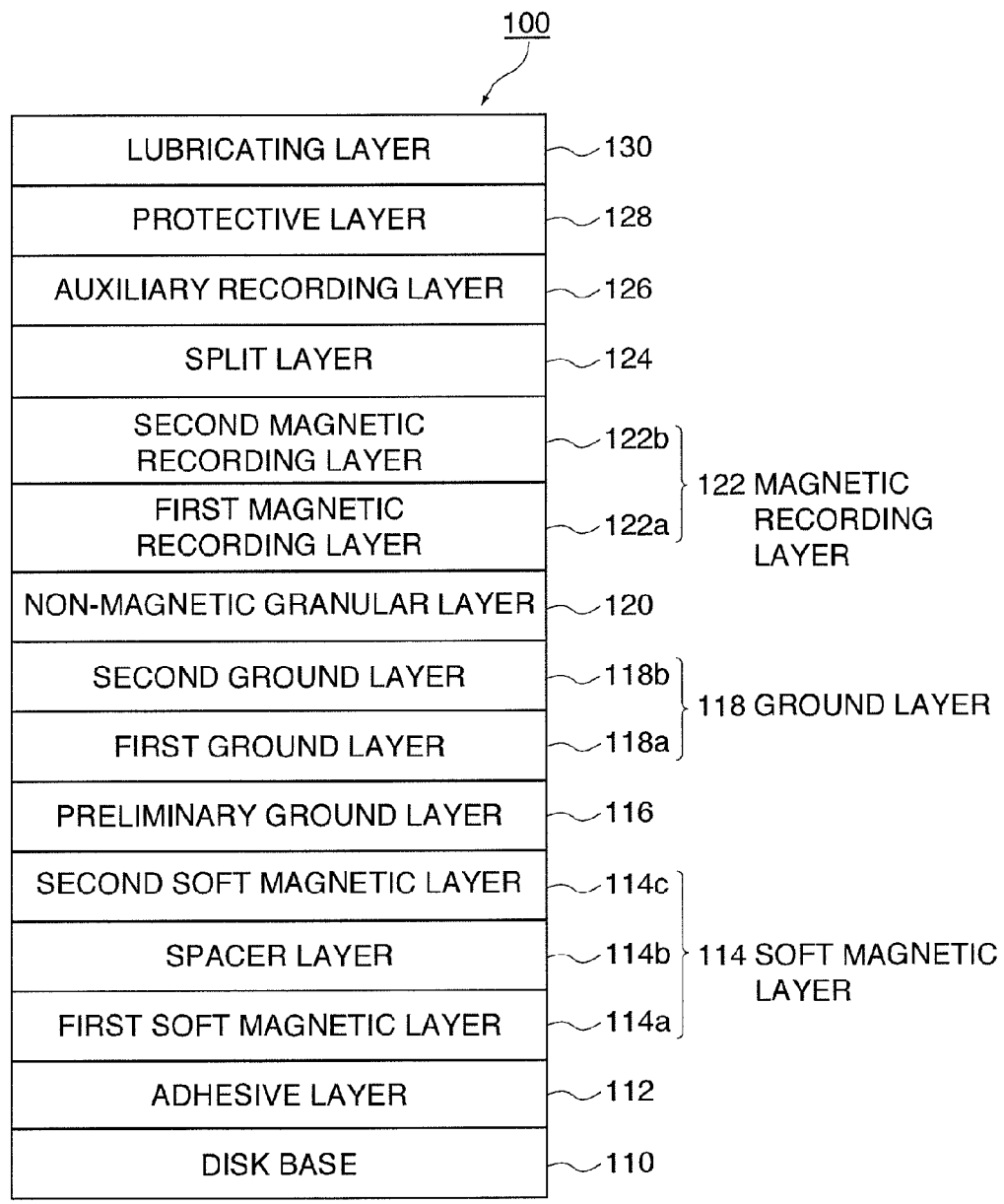
FIG. 1 is a diagram for describing the structure of a perpendicular magnetic recording medium.

100 . . . perpendicular magnetic recording medium
110 . . . disk base
112 . . . adhesion layer
114 . . . soft magnetic layer
114a . . . first soft magnetic layer
114b . . . spacer layer
114c . . . second soft magnetic layer
116 . . . preliminary ground layer
118 . . . ground layer
118a . . . first ground layer
118b . . . second ground layer
120 . . . non-magnetic granular layer
122 . . . magnetic recording layer
122a . . . first magnetic recording layer
122b . . . second magnetic recording layer
124 . . . split layer
126 . . . auxiliary recording layer
128 . . . protective layer
130 . . . lubricating layer

BEST MODE FOR CARRYING OUT THE INVENTION

In the following, with reference to the attached drawings, preferred embodiments of the present invention will be described in detail. The dimensions, materials, and others such as specific numerical values shown in the embodiments are merely examples so as to facilitate understanding of the invention, and are not meant to restrict the present invention unless otherwise specified. Note that, in the specification and drawings, components having substantially the same functions and structures are provided with the same reference numerals and are not redundantly described, and components not directly relating to the present invention are not shown in the drawings.

First Embodiment

In a first embodiment, after the first embodiment of a perpendicular magnetic recording medium according to the present invention will be first described, a split layer provided between a magnetic recording layer and an auxiliary recording layer will be described in detail.

[Perpendicular Magnetic Recording Medium]

FIG. 1 is a drawing for describing the structure of a perpendicular magnetic recording medium 100 according to a first embodiment. The perpendicular magnetic recording medium 100 shown in FIG. 1 includes a disk base 110, an adhesion layer 112, a first soft magnetic layer 114a, a spacer layer 114b, a second soft magnetic layer 114c, a preliminary ground layer 116, a first ground layer 118a, a second ground layer 118b, a non-magnetic granular layer 120, a first magnetic recording layer 122a, a second magnetic recording layer 122b, a split layer 124, an auxiliary recording layer 126, a protective layer 128, and a lubricating layer 130. Note that the first soft magnetic layer 114a, the spacer layer 114b, the second soft magnetic layer 114c together form a soft magnetic layer 114. The first ground layer 118a and the second ground layer 118b together form a ground layer 118. The first magnetic recording layer 112a and the second magnetic recording layer 122b together form a magnetic recording layer 122.

As the disk base 110, a glass disk formed by molding an amorphous aluminosilicate glass in a disk form by direct pressing can be used. Note that the type, size, thickness, and others of the glass disk are not particularly restrictive. As a material of the glass disk, for example, an aluminosilicate glass, a soda lime glass, a soda aluminosilicate glass, an aluminoborosilicate glass, a borosilicate glass, a quartz glass, a chain silicate glass, or a glass ceramic, such as a crystallized glass, is used. On this glass disk, grinding, polishing, and chemical strengthening are sequentially performed, and the smooth non-magnetic disk base 110 formed of the chemically-strengthened glass disk can be obtained.

On the disk base 110, the adhesion layer 112 to the auxiliary recording layer 126 are sequentially formed by DC magnetron sputtering, and the protective layer 128 can be formed by CVD. Then, the lubricating layer 130 can be formed by dip coating. Note that it is also preferred to use an inline-type film forming method in view of high productivity. The structure of each layer is described below.

The adhesion layer 112 is formed in contact with the disk base 110, including a function of increasing delamination strength between the soft magnetic layer 114 formed on the adhesion layer and the disk base 110 and a function of refining and homogenizing crystal grains of each layer formed on the soft magnetic layer 114. When the disk base 110 is made of an amorphous glass, it is preferred that the adhesion layer 112 be an amorphous alloy film so as to adapt to the surface of the amorphous glass.

As the adhesion layer 112, for example, it can be selected from a group of a CrTi-type amorphous layer, a CoW-type amorphous layer, a CrW-type amorphous layer, a CrTa-type amorphous layer, and a CrNb-type amorphous layer. Among others, a CrTi-type alloy film is particularly preferred because it forms an amorphous metal film containing fine crystals. The adhesion layer 112 may be a monolayer formed of a single material, or may be formed by laminating a plurality of layers.

The soft magnetic layer 114 is a layer for temporarily forming a magnetic path at recording time in order to let a magnetic flux pass through the magnetic recording layer 122 in a perpendicular direction in the perpendicular magnetic recording type. The soft magnetic layer 114 can be configured to include AFC (AntiFerro-magnetic exchange Coupling) by interposing the non-magnetic spacer layer 114b between the first soft magnetic layer 114a and the second soft magnetic layer 114c. With this, the magnetizing direction of the soft magnetic layer 114 can be aligned with high accuracy along the magnetic path (a magnetic circuit). With this, perpendicular components in the magnetizing direction are extremely decreased, thereby reducing noise occurring from the soft magnetic layer 114. As the compositions of the first soft magnetic layer 114a and the second soft magnetic layer 114c, a cobalt-type alloy, such as a CoTaZr; a Co—Fe-type alloy, such as CoCrFeB or CoFeTaZr; or a Ni—Fe-type alloy, such as a [Ni—Fe/Sn]n multilayered structure can be used.

The preliminary ground layer 116 is a non-magnetic alloy layer, including an operation of protecting the soft magnetic layer 114 and a function of orienting an axis of easy magnetization of a hexagonal close-packed structure (hcp structure) contained in the ground layer 118 formed on the preliminary ground layer 116 in a direction perpendicular to the disk. It is preferred that the preliminary ground layer 116 have a (111) plane of a face-centered cubic structure (fcc structure) parallel to a main surface of the disk base 110. The preliminary ground layer 116 may also be configured to have these crystal structures and an amorphous structure in a mixed manner. As a material of the preliminary ground layer 116, it can be selected from a group of Ni, Cu, Pt, Pd, Zr, Hf, Nb, and Ta. Further, an alloy that contains these metals as a main component and that contains any one of Ti, V, Cr, Mo, and W as an additive element may be selected. For example, as an alloy having an fcc structure, NiW, CuW, or CuCr can be preferred to be selected.

The ground layer 118 has an hcp structure, and has an operation of growing a crystal with an hcp structure of Co in the magnetic recording layer 122 as a granular structure. Therefore, the orientation of the magnetic recording layer 122 can be more improved as the crystalline orientation of the ground layer 118 becomes higher, that is, as a (0001) surface of the crystal of the ground layer 118 becomes more parallel to the main surface of a disk base 110. A typical material of the ground layer 118 is Ru, though the material can be selected from RuCr and RuCo instead. Because Ru has an hcp structure and has crystal lattice spacing close to that of Co, the magnetic recording layer 122 containing Co as a main component can be well oriented.

When Ru is used for the ground layer 118, by changing gas pressure at sputtering, a two-layer structure made of Ru can be formed. Specifically, Ar gas pressure is set at a predetermine pressure, namely, a low pressure when the first ground layer 118a on the bottom side is formed, and the Ar gas pressure is set at a pressure higher than when the first ground layer 118a on the bottom side is formed, namely, a high pressure when the second ground layer 118b on the top side is formed. This makes it possible for the first ground layer 118a to improve in crystalline orientation of the magnetic recording layer 122 and for the second ground layer 118b to refine a particle diameter of a magnetic particle of the magnetic recording layer 122.

Further, as the gas pressure increases, an average free path of plasma ions to be sputtered becomes shorter, and thus a film formation speed becomes slower and a coating film becomes rougher, and therefore it is possible to promote separation and refinement of the crystal particles of Ru, and also it becomes possible to refine the crystal particles of Co.

Furthermore, a small amount of oxygen may be contained in Ru of the ground layer 118. This makes it possible to promote further separation and refinement of the crystal particles of Ru, and to achieve further isolation and refinement of the magnetic recording layer 122. Note that although oxygen may be caused to be contained by reactive sputter, it is preferred that a target containing oxygen be used at film formation by sputtering.

The non-magnetic granular layer 120 is a non-magnetic layer having a granular structure. On the hcp crystal structure of the ground layer 118, the non-magnetic granular layer is formed, on which a granular layer of the first magnetic recording layer 122a (or the magnetic recording layer 122) is grown. With this, the magnetic granular layer has an operation of separating the magnetic granular layer from a stage of initial growth (start-up). This makes it possible to promote isolation of the magnetic particles of the magnetic recording layer 122. The composition of the non-magnetic granular layer 120 can have a granular structure by subjecting a non-magnetic substance to segregation between non-magnetic crystal particles made of a Co-type alloy to form a grain boundary.

In this embodiment, CoCr—$SiO_2$ is used for this non-magnetic granular layer 120. This causes the non-magnetic granular layer 120 to have a granular structure because $SiO_2$ (non-magnetic substance) is subjected to segregation between the Co-type alloys (non-magnetic crystal particles) to form a grain boundary. Note that CoCr—$SiO_2$ is merely an example, and is not meant to be restrictive. Alternatively, CoCrRu—$SiO_2$ can be preferred to be used, and, in place of Ru, Rh (rhodium), Pd (palladium), Ag (silver), Os (osmium), Ir (iridium), or Au (gold) can also be used. Still further, the non-magnetic substance can be any non-magnetic substance that can form a grain boundary portion around magnetic particles so as to suppress or interrupt an exchange interaction operation between the magnetic particles (magnetic grains), and that does not allow solid solution with cobalt (Co). Examples can include silicon oxide ($SiO_x$), chromium oxide ($CrO_2$), titanium oxide ($TiO_2$), zircon oxide ($ZrO_2$), and tantalum oxide ($Ta_2O_5$).

In this embodiment, the non-magnetic granular layer 120 is provided on the ground layer 188 (the second ground layer 188b). This is not meant to be restrictive, and the perpendicular magnetic recording medium 100 can be configured without the non-magnetic granular layer 120.

The magnetic recording layer 122 has a granular structure in a columnar shape in which a non-magnetic substance is subjected to segregation around magnetic particles of a hard magnetic substance selected from a group consisting of a Co-type alloy, a Fe-type alloy, and a Ni-type alloy to form a ground boundary. By providing the non-magnetic granular layer 120, these magnetic particles can epitaxially grow continuously from the granular structure. Though the magnetic recording layer 122 may be a single layer, it comprises the first magnetic recording layer 122a and the second magnetic recording layer 122b different in composition and film thickness from each other in this embodiment. This makes it possible for fine crystal particles of the second magnetic recording layer 122b to grow continuously from crystal particles of the first magnetic recording layer 122a, so that refinement of the second magnetic recording layer 122b serving as a main recording layer can be achieved and the SNR can be improved.

In this embodiment, CoCrPt—$Cr_2O_3$ is used for the first magnetic recording layer 112a. CoCrPt—$Cr_2O_3$ forms a granular structure in which Cr and $Cr_2O_3$ (oxides), which are non-magnetic substances, are subjected to segregation around magnetic particles (grains) made of CoCrPt to form a ground boundary and the magnetic particles are grown in a columnar shape. The magnetic particles are epitaxially grown continuously from the granular structure of the non-magnetic granular layer.

Further, CoCrPt—$SiO_2$—$TiO_2$ is used for the second magnetic recording layer 122b. Also in the second magnetic recording layer 122b, a granular structure is formed in which Cr, $SiO_2$ and $TiO_2$ (composite oxide), which are non-magnetic substances, are subjected to segregation around magnetic particles (grains) made of CoCrPt to form a ground boundary and the magnetic particles are grown in a columnar shape.

The reason why the magnetic recording layer 122 is separated into the first magnetic recording layer 122a and the second magnetic recording layer 122b is that the second magnetic recording layer 122b serving as the main recording layer is configured to prioritize the SNR and the first magnetic recording layer 122a is configured to prioritize the coercive force so that the coercive force and the SNR become compatible. Specifically, in the first magnetic recording layer 122a an amount of $Cr_2O_3$ that is an oxide is reduced and a particle diameter of the magnetic particle is made large, thereby increasing the coercive force. In the second magnetic recording layer 122b, isolation and refinement of the magnetic particles are achieved by $SiO_2$, and an improvement in SNR is achieved by $TiO_2$, and the improvement in SNR is also performed by increasing a total amount of oxides.

Note that the substances for use in the first magnetic recording layer 122a and the second magnetic recording layer 122b described above are merely examples, and are not meant to be restrictive. In this embodiment, the materials (targets) of the first magnetic recoding layer 122a and the second magnetic recording layer 122b are different from each other, but not limited to this, and the materials thereof may be of the same composition or type as each other. A non-magnetic substance for forming a non-magnetic region may be, for example, an oxide such as a silicon oxide ($SiO_x$), chromium oxide ($Cr_xO_y$), titanium oxide ($TiO_2$), zircon oxide ($ZrO_2$), tantalum oxide ($Ta_2O_5$), cobalt oxide ($CoO_2$ or $CO_3O_4$), iron oxide ($Fe_2O_3$), or boron oxide ($B_2O_3$). Also, a nitride, such as BN, and a carbide, such as $B_4C_3$, can be suitably used.

Furthermore, in this embodiment, one type of non-magnetic substance (oxide) is used in the first magnetic recording layer 122a, and two types thereof are used in the second magnetic recording layer 122b, but this is not meant to be restrictive, and it is also possible to use two or more types of non-magnetic substances in combination in either or both of the first magnetic recording layer 122a and the second magnetic recording layer 122b. Here, although the types of non-magnetic substances contained are not limited, it is preferred that $SiO_2$ and $TiO_2$ are particularly contained in this embodiment. Therefore, unlike this embodiment, when the magnetic recording layer 122 is composed of a single layer, it is preferred that this magnetic recording layer 122 be made of CoCrPt—$SiO_2$—$TiO_2$.

The split layer 124 is a non-magnetic layer disposed between the magnetic recording layer 122 (the second magnetic recording layer 122b) and the auxiliary recording layer 126. In this embodiment, the split layer 124 is a thin film containing Ru and oxygen. Since the split layer 124 contains oxygen, in a case where the split layer 124 is formed on the magnetic recording layer 122 containing a large amount of oxides and the auxiliary recording layer 126 that does not contain oxygen is formed on the split layer 124, the split layer 124 magnetically and structurally form a bridge between the magnetic recording layer 122 and the auxiliary recording layer 126.

The auxiliary recording layer 126 is a magnetic layer magnetically approximately continuing in an in-plane direction of the main surface of the base. The auxiliary recording layer 126 is required to be adjacent or close to the magnetic recording layer 122 so as to have a magnetic interaction therewith. A material of the auxiliary recording layer 126 may be, for example, CoCrPt or CoCrPtB, or can be composed of any of these materials containing a slight amount of oxide. The auxiliary recording layer 126 is aimed at adjusting a reversed magnetic domain nucleation magnetic field Hn and adjusting the coercive force Hc, thereby achieving improvement in resistance to heat fluctuations, OW characteristic, and SNR. To achieve this aim, it is desired that the auxiliary recording layer have high perpendicular magnetic anisotropy Ku and saturation magnetization Ms. Note that, though the auxiliary recording layer 126 is disposed above the magnetic recording layer 122 in this embodiment, it may be disposed therebelow.

Note that "magnetically continuing" means that magnetization continues. "Approximately continuing" means that the auxiliary recording layer 126 is not necessarily a single magnet when observed as a whole and the magnetism may be discontinued due to the grain boundary of the crystal particles and others. In the grain boundary, the crystal may be not only discontinuous but also Cr may be subjected to segregation. Furthermore, a slight amount of oxide may be contained for segregation. However, even when a grain boundary containing an oxide is formed in the auxiliary recording layer 126, it is preferred that the area (amount of oxide content) of the grain boundary is smaller than that of the ground boundary of the magnetic recording layer 122. Though the function and operation of the auxiliary recording layer 126 are not necessarily clear, it is thought that the auxiliary recording layer 126 has a magnetic interaction (performs exchange coupling) with the granular magnetic particles of the magnetic recording layer 122, thereby adjusting Hn and Hc and improving resistance to heat fluctuations and the SNR. It is also thought that, because the area of the crystal particles connected to the granular magnetic particles (crystal particles having a magnetic interaction) is larger than the cross-section of the granular magnetic particles, the auxiliary recording layer 126 receives more magnetic fluxes from a magnetic head to become prone to magnetization reversal, thereby improving an overall OW characteristic.

The protective layer 128 can be formed by forming a film of carbon by CVD with vacuum being kept. The protective layer 128 is a layer for protecting the perpendicular magnetic recording medium 100 from an impact of the magnetic head. In general, a carbon film formed by CVD has a film hardness improved as compared with those formed by sputtering, and therefore the perpendicular magnetic recording medium 100 can be effectively protected from an impact from the magnetic head.

The lubricating layer 130 can be formed by dip coating with the use of PFPE (perfluoropolyether). PFPE has a long-chain-shaped molecular structure, and combines with N atoms on the surface of the protective layer 128 with high affinity. With this operation of the lubricating layer 130, even when the magnetic head comes into contact with the surface of the perpendicular magnetic recording medium 100, damage and loss of the protective layer 128 can be prevented.

According to the manufacturing process described above, the perpendicular magnetic recording medium 100 can be obtained. Next, the split layer 124, which is a feature of the present invention, will be described in further detail.

As described above, the split layer 124 is a non-magnetic layer containing Ru and oxygen and disposed between the magnetic recording layer 122 and the auxiliary recording layer 126. Providing the split layer 124 thus configured makes it possible to reduce noise thought to be due to the auxiliary recording layer 126 to improve the SNR. It is thought that this is because the auxiliary recording layer 126 can adjust a fine structure inherited from the magnetic recording layer 122 when the auxiliary recording layer 126 makes crystal growth. In a portion of the split layer 124 positioned on the magnetic particles of the magnetic recording layer 122, Ru causes Co of the auxiliary recording layer 126 to inherit the crystal structure of Co of the magnetic recording layer 122. In a portion of the split layer 124 positioned on the grain boundary of the magnetic recording layer 122, because oxygen and Ru forming the grain boundary are substantially different in lattice constant from each other, inheritance of the crystalline orientation does not occur, but RU and oxygen freely migrate to form a coating film (crystal). Since the auxiliary recording layer 126 is formed on the crystal of Ru, separation of the Co particles of the auxiliary recording layer 126 is further promoted to achieve noise reduction. Therefore, the crystalline orientation of the auxiliary recording layer 126 is improved as a whole.

Here, though the split layer 124 made of only Ru shows an improvement in OW characteristic or the like, the split layer 124 containing Ru and oxygen shows a significant improvement in SNR. This is because high coercive force cannot be obtained by forming a coating film made of only Ru on a grain boundary containing a large amount of oxygen. On the other hand, like the present invention, since the split layer 124 is caused to contain Ru and oxygen, oxygen atoms contained have a high affinity for oxygen atoms contained in the grain boundary, and selectively segregate. That is, it is thought that, by causing the split layer 124 to contain oxygen in a smaller proportion than the magnetic recording layer 122 contains oxides, the split layer 124 can form a bridge between the grain boundary of the magnetic recording layer 122 containing a large amount of oxygen and the auxiliary recording layer 126 not containing oxygen.

Oxygen contained in Ru in the split layer 124 includes either one or both of oxygen atoms as a single body and oxygen atoms as an oxide. Ru is caused to contain a slight amount of oxygen by a method of causing a target to contain oxygen in advance or by reactive sputtering that oxygen is added to atmosphere gas during sputtering. The reactive sputtering is a method of forming a compound film or mixed film of the atoms of a target and the atoms of active gas by adding the active gas to atmosphere gas supplied into a chamber where sputtering is performed. Therefore, by adding oxygen gas as active gas during sputtering of the split layer 124, the split layer 124 can be caused to contain oxygen.

However, regarding the reactive sputtering, because a small amount of oxygen gas is added to the atmosphere gas, it is very difficult to adjust the amount of oxygen contained in the split layer 124 to a desired amount. It is also difficult to adjust the active gas so as to distribute evenly in the atmosphere gas, and therefore distribution of oxygen becomes uneven in the split layer 124. Furthermore, it is difficult to completely evacuate the oxygen gas mixed in the split layer 124 during formation of the split layer 124, the oxygen gas remaining in the chamber enters a chamber where the layers following the split layer 124 are formed. Therefore, it is preferred that the split layer 124 is subjected to the sputtering using a target made of Ru and an oxide, because oxygen can be caused to be contained evenly in the whole of the film.

An oxide contained in the split layer 124 may be $NO_3$, $TiO_2$, or RuO. As described above, it is preferred that the split layer 124 be caused to contain oxygen by causing the target of sputtering to contain an oxide. There are various possible oxides, but in particular using an oxide of W, Ti, or Ru can improve an electromagnetic conversion characteristic (SNR). Among them, $WO_3$ achieves a high effect. This is because $WO_3$ is an unstable oxide, and therefore oxygen is dissociated during sputtering, and the oxygen dissociated produces an effect of oxygen addition. Alternatively, other examples of oxides can be such oxides as silicon oxide ($SiO_X$), chrome oxide ($Cr_XO_Y$), titanium oxide ($TiO_2$), zircon oxide ($ZrO_2$), tantalum oxide ($Ta_2O_5$), iron oxide ($Fe_2O_3$), and boron oxide ($B_2O_3$). A nitride, such as BN, or a carbide, such as $B_4C_3$, is also suitably used.

The split layer 124 may have a film thickness of 2 Å to 10 Å (0.2 nm to 1 nm). By adopting such a thin film, the split layer 124 does not form a complete film, and therefore the inheritance of the crystalline orientation from the crystal particles of the magnetic recording layer 122 to the auxiliary recording layer 126 is not disconnected. If the film thickness of the split layer 124 is 10 Å or more, the magnetic recording layer 122 and the auxiliary recording layer 126 are magnetically completely discontinued, and therefore a desired SNR cannot be obtained. On the other hand, if the film thickness is 2 Å or less, the split layer 124 cannot form a coating film.

The magnetic recording layer 122 may include two or more kinds of oxides. This makes it possible to obtain characteristics of a plurality of oxides, and therefore it becomes possible to obtain a perpendicular magnetic recording medium that achieves further refinement and isolation of the magnetic particles of the magnetic recording layer 122 to reduce noise and improve the SNR so that a high recording density is achieved.

The magnetic recording layer 122 may include $SiO_2$ and $TiO_2$ as oxides. $SiO_2$ has a characteristic of promoting refinement and isolation of magnetic particles, and $TiO_2$ has a characteristic of improving an electromagnetic conversion characteristic (particularly, SNR). By causing these oxides in combination to segregate to the grain boundary of the magnetic recording layer 122, both their advantages can be gained.

The magnetic recording layer 122 may include 5 mol % or more of oxide constituting a grain boundary portion. This is because, when 5 mol % or more of oxide is included, high magnetostatic characteristic and electromagnetic conversion characteristic can be obtained, and the characteristic of the auxiliary recording layer 126 is lowered, which cannot be ignored, when the oxide is in such a range, but the characteristic can be improved by providing the above split layer 124.

Examples

The adhesion layer 112 to the auxiliary recording layer 126 were sequentially formed on the disk base 110 in an Ar atmosphere by DC magnetron sputtering using an apparatus for film formation which was subjected to vacuuming. Note that an Ar gas pressure at a film formation time is 0.6 Pa unless otherwise specified. As the adhesion layer 112, a 10-nm-thick $CrTi_{50}$ film was formed. Regarding the soft magnetic layer 114, as the first soft magnetic layer 114a and the second soft magnetic layer 114c, 20-nm-thick $(CO_{60}Fe_{40})92$-Ta3-Zr5 films were formed, respectively, and, as the spacer layer 114b, a 0.5-nm-thick Ru film was formed. As the preliminary ground layer 116, a 7-nm-thick $NiW_5$ film was formed. As the first ground layer 118a, a 10-nm-thick Ru film was formed. As the second ground layer 118b, a 10-nm-thick Ru film was formed at 5 Pa. As the non-magnetic granular layer 120, a 1-nm-thick non-magnetic $(CoCr_{40})88$-$(SiO_2)12$ film was formed at 3 Pa. As the first magnetic recording layer 122a, a 2-nm-thick $(CoCr_{12}Pt_{18})93$-$(Cr_2O_3)7$ film was formed at 3 Pa. As the second magnetic recording layer 122b, a 10-nm-thick $(CO_{71}Cr_{13}Pt_{16})90$-$(SiO_2)5$-$(TiO_2)5$ film was formed at 3 Pa. The split layers 124 was so formed as to have a film thickness of 3 Å, and the following examples and comparative examples of the split layer 124 were produced to compare the compositions thereof with each other. As the auxiliary recording layer 126, a 7-nm-thick $CO_{62}Cr_{18}Pt_{15}B_5$ film was formed. As the protective layer 128, a 5-nm-thick film was formed by CVD method using $C_2H_4$ and CN, and, as the lubricating layer 130, a 1.3-nm-thick film was formed by dip coating using PFPE.

Figure 2:
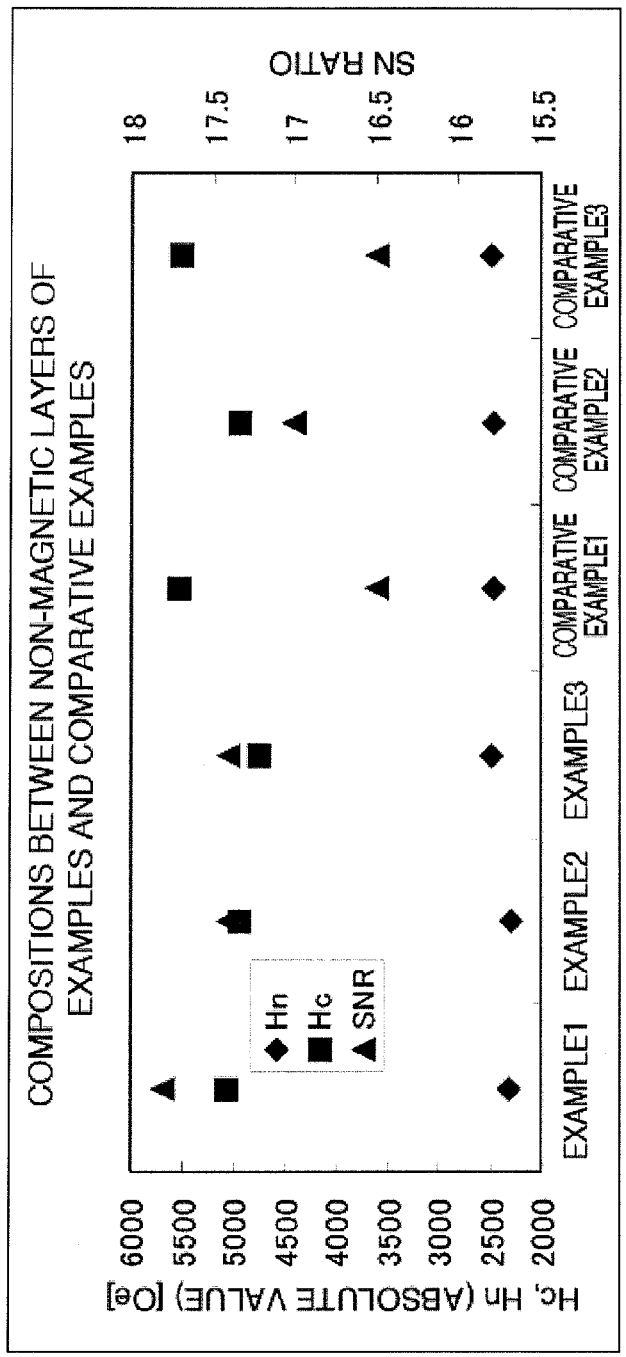
FIG. 2 is a diagram including a table and a graph, showing examples and comparative examples different in composition of a split layer.

FIG. 2 is a diagram including a table and a graph for comparing the compositions of the split layer 124 of the examples and the comparative examples with each other. The compositions of the split layers 124 of an example 1, an example 2, and an example 3 were Ru—$(WO_3)14$, Ru—$(SiO_2)10$, and Ru+$O_2$ exposure (reactive sputtering: 5% of atmosphere gas was oxygen), respectively. A comparative example 1 did not include the split layer 124, the composition of comparative example 2 was only Ru, and the composition of comparative example 3 was only $O_2$ exposure. The film thickness of the split layer 124 was 3 Å except in the comparative examples 1 and 3. Regarding each of the examples and comparative examples, a coercive force Hc and a reversed magnetic domain nucleation magnetic field Hn as magnetostatic characteristics and an SNR as an electromagnetic conversion characteristic were measured. Since the higher the coercive force Hc and the reversed magnetic domain nucleation magnetic field Hn, the better, they are coaxially shown as absolute values on the graph.

From FIG. 2, it is found that the SNRs of the examples 1 to 3 were significantly improved as compared with the comparative examples. In particular, the SNR of the example 1 of forming the split layer 124 from $RuWO_3$ was improved the most. Though the SNR of the comparative example 2 with the split layer 124 made of Ru was the best among those of the comparative examples, the SNR of the comparative example 2 was less than those of the examples 1 to 3 in which the split layer 124 also contained oxygen. However, no improvement in the SNR was seen in the comparative example 3 in which the magnetic recording layer 122 was exposed to oxygen, and therefore it is found that it is not effective to cause the magnetic recording layer 122 to contain oxygen but it is effective to cause the split layer 124 to contain oxygen.

The coercive force Hc of the comparative example 1 in which the split layer 124 was not provided was the largest, and the coercive forces Hc of the other cases were less than that. However, at present, such low coercive forces Hc are not problematic because the heat fluctuation phenomenon can be suppressed with a coercive force Hc of 4500 [Oe] or more, more preferably, 4700 [Oe] or more. Furthermore, since the higher the SNR is, the easier the signal can be read, the coercive force Hc may be relatively low. Similarly, the reversed magnetic domain nucleation magnetic fields Hn of the examples were slightly less than those of the comparative examples, but those are within a non-problematic range. That is, according to the present invention, it is found that the SNR can be significantly improved without needlessly reducing the coercive force Hc and the reversed magnetic domain nucleation magnetic field Hn.

Furthermore, it is found that, among the examples, the example 1 with the split layer 124 made from $RuWO_3$ had the highest coercive force Hc. That is, it is found that the SNR and the coercive force Hc of the example 1 to 3 were higher than those of the examples 2 and 3, and therefore $RuWO_3$ is an optimum composition.

Figure 3:
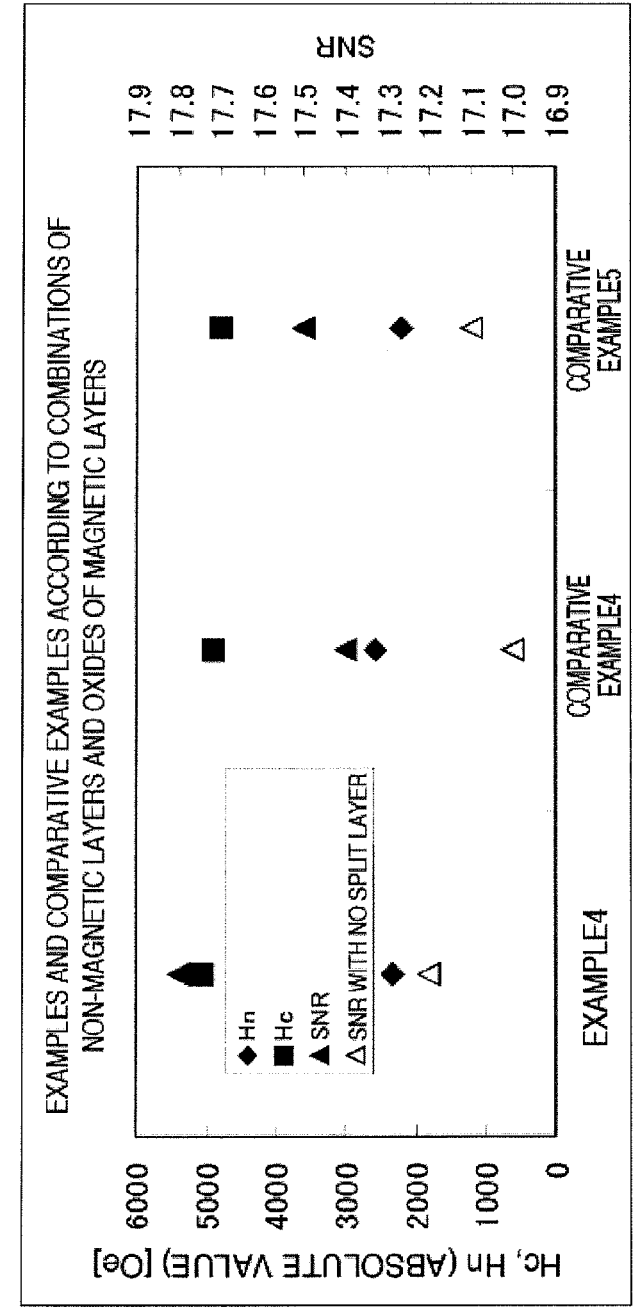
FIG. 3 is a diagram including a table and a graph, showing examples and comparative examples different in combination of oxides in a magnetic layer.

FIG. 3 is a diagram including a table and a graph showing examples and comparative examples according to combinations of oxides of the magnetic layers. The composition of the split layer 124 was $RuWO_3$ and the film thickness thereof was 3 Å in all the cases. The magnetic recording layer 122 contained a plurality of oxides of $SiO_2$ and $TiO_2$ in combination in the example 1, on the other hand, the magnetic recording layer 122 contained only $SiO_2$ as the oxide in an example 4, and only $TiO_2$ as the oxide in an example 5. The examples 1, 4 and 5 had the same configuration as the example 1, except that a total amount of oxide was 10 mol % equally.

By comparing the example 4 and the example 5 with each other, it is found that $SiO_2$ is high in coercive force Hc and $TiO_2$ is high in SNR. With reference to the example 4, it is found that both the coercive force Hc and the SNR are further improved. That is, containing two kinds of oxides of $SiO_2$ and $TiO_2$ improved the SNR by 0.3 to 0.4 dB. Note that by comparing the SNR when the split layer 124 was not provided and the SNR when the split layer 124 was provided with each other, it is found that, while the SNRs were improved by about 0.4 in the examples 4 and 5, the SNR was improved by about 0.6 in the example 1. From this, it is found that causing the magnetic recording layer 122 to contain a plurality of oxides in combination makes it possible to obtain an advantage of the present invention effectively.

FIG. 4 shows TEM photographs of the auxiliary recording layer 126 of the example 1 (in a case where the split layer 124 made of $RuWO_3$ was provided) and the comparative example 1 (in a case where the split layer 124 was not provided). With reference to FIG. 4, it is found that a fine structure of the auxiliary recording layer 126 is blurred in the comparative example 1, but interparticle separation is obviously promoted in the example 1. That is, it can be said that, in the magnetic layer disposed on the split layer, separation of the crystal particles is promoted. This can confirm that the split layer 124 was able to achieve noise reduction of the auxiliary recording layer 126.

As described above, according to the perpendicular magnetic recording medium 100 of the first embodiment, improvement in SNR can be achieved by reducing the noise thought to be due to the auxiliary recording layer. This makes it possible to achieve higher recording density of the perpendicular magnetic recording medium 100.

Second Embodiment

A second embodiment of the perpendicular magnetic recording medium according to the present invention will be described. The components that have already been described in the first embodiment are provided with the same reference numerals and are not redundantly described.

Like the first embodiment described above, by providing the split layer 124, noise reduction can be achieved. However, instead, the coercive force Hc tends to be reduced. It is possible to increase the film thickness of the magnetic recording layer in order to improve the coercive force, but, because magnetic spacing from the magnetic head to the soft magnetic layer increases, magnetic flux diffuses, and side fringing occurs, so it becomes difficult to achieve a high recording density. Therefore, in the present embodiment, by reviewing the composition of the magnetic recording layer, the coercive force and SNR in the configuration composed of two granular magnetic layers, an auxiliary recording layer, and a split layer are made compatible.

The perpendicular magnetic recording medium 100 of the second embodiment is generally the same as one described in the first embodiment. However, in the second embodiment, the second magnetic recording layer 122b is configured to have a lower Pt content than the first magnetic recording layer 122a. This makes it possible to improve the coercive force in the first magnetic recording layer 122a due to the high Pt content while securing a high SNR in the second magnetic recording layer 122b that is the main recording layer. Therefore, a high SNR and a high coercive force become compatible as a whole.

The Pt content of the first magnetic recording layer 122a may be 16 at % to 22 at %. The Pt content within such a range can improve the coercive force positively. Note that, when the Pt content is less than 16 at %, reduction in coercive force due to the split layer cannot be compensated, and, when the Pt content is more than 22 at %, the amount of Co is reduced, and saturation magnetization Ms is reduced.

The Pt content of the second magnetic recording layer 122b may be 14 at % to 19 at %. The Pt content within such a range makes it possible for Cr to suppress noise due to Pt, and therefore a high SNR can be secured. Note that, when the Pt content is less than 14 at %, the effect of improvement in coercive force due to improvement in magnetic anisotropy Ku is too small, and, when the Pt content is more than 19 at %, noise is increased.

When the thickness of the first magnetic recording layer 122a is represented by A nm, and the thickness of the second magnetic recording layer 122b is represented by B nm, A/B may be 15% to 30%. Thinning the first magnetic recording layer 122a to such an extent as described above makes it possible to suppress an influence from noise even if the noise is increased by an increase in Pt. That is, in both of a case where the Pt content of the magnetic recording layer is increased and a case where the thickness thereof is increased, the coercive force is improved and noise is increased. However, when these cases are compared with each other, increasing the Pt content has a larger effect on the coercive force. Therefore, by increasing the Pt content of the first magnetic recording layer 122a and thinning the thickness thereof, increase in noise is suppressed and the coercive force is further improved.

Note that the auxiliary recording layer 126 may contain 14 at % to 18 at % of Cr. This makes it possible to reduce the saturation magnetization Ms of the auxiliary recording layer moderately and achieve noise reduction. Even if the auxiliary recording layer 126 contains such a large amount of Cr, providing the non-magnetic split layer prevents the Cr of the auxiliary recording layer 126 from diffusing in the magnetic recording layer, and therefore reduction in characteristic is not caused.

Examples

On the disk base 110, the adhesion layer 112 to the auxiliary recording layer 126 were sequentially formed in an Ar atmosphere by DC magnetron sputtering using an apparatus for film formation subjected to vacuuming. Note that an Ar gas pressure at film formation time is 0.6 Pa unless otherwise specified. As the adhesion layer 112, a 10-nm-thick $CrTi_{50}$ film was formed. Regarding the soft magnetic layer 114, as the first soft magnetic layer 114a and the second soft magnetic layer 114c, 20-nm-thick $(CO_{60}Fe_{40})92$-Ta3-Zr5 films were formed, and, as the spacer layer 114b, a 0.5-nm-thick Ru film was formed. As the preliminary ground layer 116, a 7-nm-thick $NiW_5$ film was formed. As the first ground layer 118a, a 10-nm-thick Ru film was formed. As the second ground layer 118b, a 10-nm-thick Ru film was formed at 5 Pa. As the non-magnetic granular layer 120, a 1-nm-thick non-magnetic $(CoCr_{40})88$-$(SiO_2)12$ film was formed at 3 Pa. As the first magnetic recording layer 122a, a 2-nm-thick $(CoCr_{12}Pt_{18})93$-$(Cr_2O_3)7$ film was formed at 3 Pa. As the second magnetic recording layer 122b, a 10-nm-thick $(Co_{71}Cr_{13}Pt_{16})90$-$(SiO_2)5$-$(TiO_2)5$ film was formed at 3 Pa. The split layer 124 was so formed as to have a film thickness of 3 Å, and the following examples and comparative examples of the split layer 124 were produced to compare the compositions thereof with each other. As the auxiliary recording layer 126, a 7-nm-thick $CO_{62}Cr_{18}Pt_{15}B_5$ film was formed. As the protective layer 128, a 5-nm-thick film was formed by CVD method using $C_2H_4$ and CN, and, as the lubricating layer 130, a 1.3-nm-thick film was formed by dip coating film using PFPE.

FIGS. 5A to 5C explain the results of fixing Ru—$(WO_2)14$ as the oxide of the split layer and changing the respective Pt amounts of the first magnetic recording layer 122a and the second magnetic recording layer 122b.

In FIGS. 5A to 5C, a line 1 represents a case where the Pt amount of the first magnetic recording layer is fixed at 18 at % and the Pt amount of the second magnetic recording layer is changed. A line 2 represents a case where the Pt amount of the second magnetic recording layer is fixed at 16 at % and the Pt amount of the first magnetic recording layer is changed. FIG. 5A is a table showing measured values of the coercive forces Hc and SNRs of the line 1 and the line 2, FIG. 5B is a graph showing changes in coercive force, and FIG. 5C is a graph showing changes in SNR.

By referring to the line 1, it is found that a high coercive force can be obtained when the Pt amount of the second magnetic recording layer is 14 at % or more but the SNR is significantly reduced when the Pt amount is 19% or more. Therefore, it is preferred that the Pt amount of the second magnetic recording layer be from 14 at % to 19 at %.

By referring to the line 2, it is found that a high coercive force and SNR can be obtained when the Pt amount of the first magnetic recording layer is from 16 at % to 22 at % but both of them rapidly lower out of this range. Therefore, it is preferred that the Pt amount of the first magnetic recording layer be from 16 at % to 22 at %.

Furthermore, by referring to the line 2 in FIG. 5B, it is found that a high coercive force (4700 [Oe] or more) can be obtained when the Pt amount of the first magnetic recording layer is 16 at % or more, that is, equal to or more than the Pt amount of the second magnetic recording layer (16 at %). On the other hand, by referring to the line 1 in FIG. 5C, it is found that a high SNR (17.6 or more) can be obtained when the Pt amount of the second magnetic recording layer is 19 at % or less and equal to or less than the Pt amount of the first magnetic recording layer (18 at %). These facts show that it is preferred that, in a configuration composed of the two-layer magnetic recording layer 122 (the first magnetic recording layer 122a, the second magnetic recording layer 122b), the auxiliary recording layer 126, and the split layer 124, the Pt content of the second magnetic recording layer 122b be smaller than that of the first magnetic recording layer 122a.

Figures 6A, 6B:
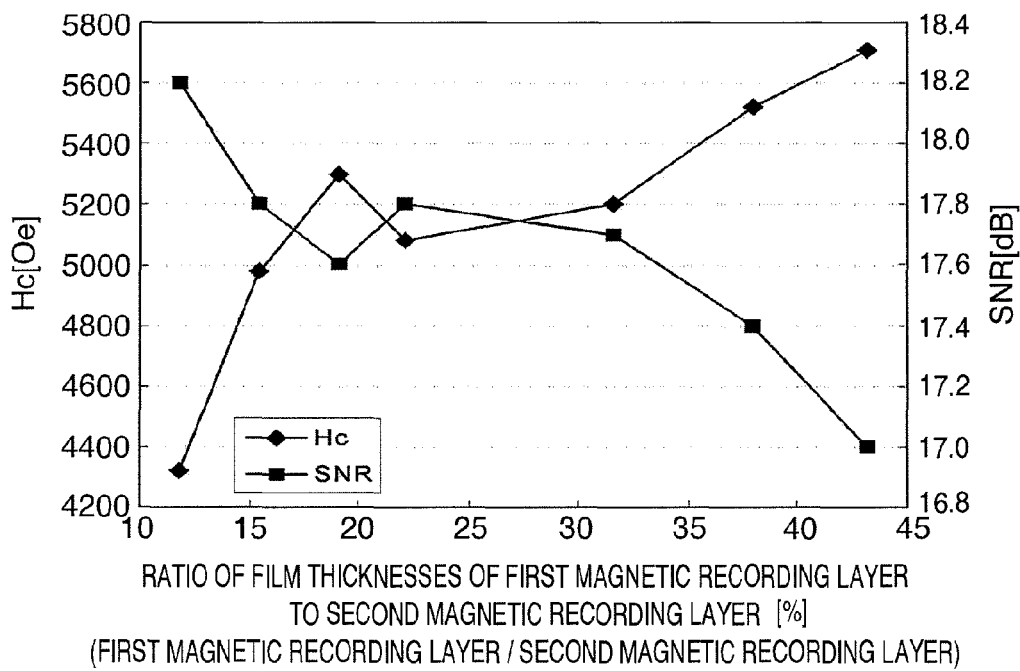
FIGS. 6A and 6B are a table and a graph, for describing results when a film thickness of a magnetic recording layer was varied.

FIGS. 6A and 6B explain the results of changing the film thicknesses of the first magnetic recording layer and the second magnetic recording layer. A line 3 shown in FIGS. 6A and 6B represents a case where $RuWO_3$ is fixed as the oxide of the split layer and the Pt amounts of the first magnetic recording layer 122a and the second magnetic recording layer 122b are 18 at % and 16 at %, respectively. FIG. 6A is a table showing measured values of the coercive force Hc and SNR of the line 3, and FIG. 6B is a graph showing changes in coercive force and SNR. In FIG. 6B, the thickness of the first magnetic recording layer is represented by A nm, the thickness of the second magnetic recording layer is represented by B nm, a horizontal axis represents A/B, and vertical axes represent the coercive force and SNR.

According to FIGS. 6A and 6B, the coercive force generally tends to increase as A/B increases (the percentage of the first magnetic recording layer increases). Then, it is found that A/B needs to be 15% or more in order to obtain a necessary coercive force (4700 [Oe]).

The SNR shows an exactly opposite tendency to the coercive force, namely, generally tends to decrease as A/B increases. Then, it is found that A/B needs to be 30% or less in order to obtain a necessary SNR (17.6).

These facts show that a high SNR and coercive force can be made compatible by setting A/B in the range of 15% to 30%.

As described above, according to the perpendicular magnetic recording medium 100 of the second embodiment, improvement in SNR can be achieved by reducing noise thought to be due to the auxiliary recording layer. This makes it possible to achieve higher recording density of the perpendicular magnetic recording medium 100.

Third Embodiment

A third embodiment of the perpendicular magnetic recording medium according to the present invention will be described. The components that have already been described in the first or second embodiment are provided with the same reference numerals and are not redundantly described.

In the first and second embodiments described above, it has been described that a non-magnetic layer containing Ru and oxygen is disposed between the magnetic recording layer 122 and the auxiliary recording layer 126. On the other hand, in the present embodiment, a second split layer 122c and a third magnetic recording layer 122d are also disposed between the second split layer 122c and the split layer 124. The split layer 124 and the second split layer 122c contain a Ru alloy as a main component.

Figure 7:
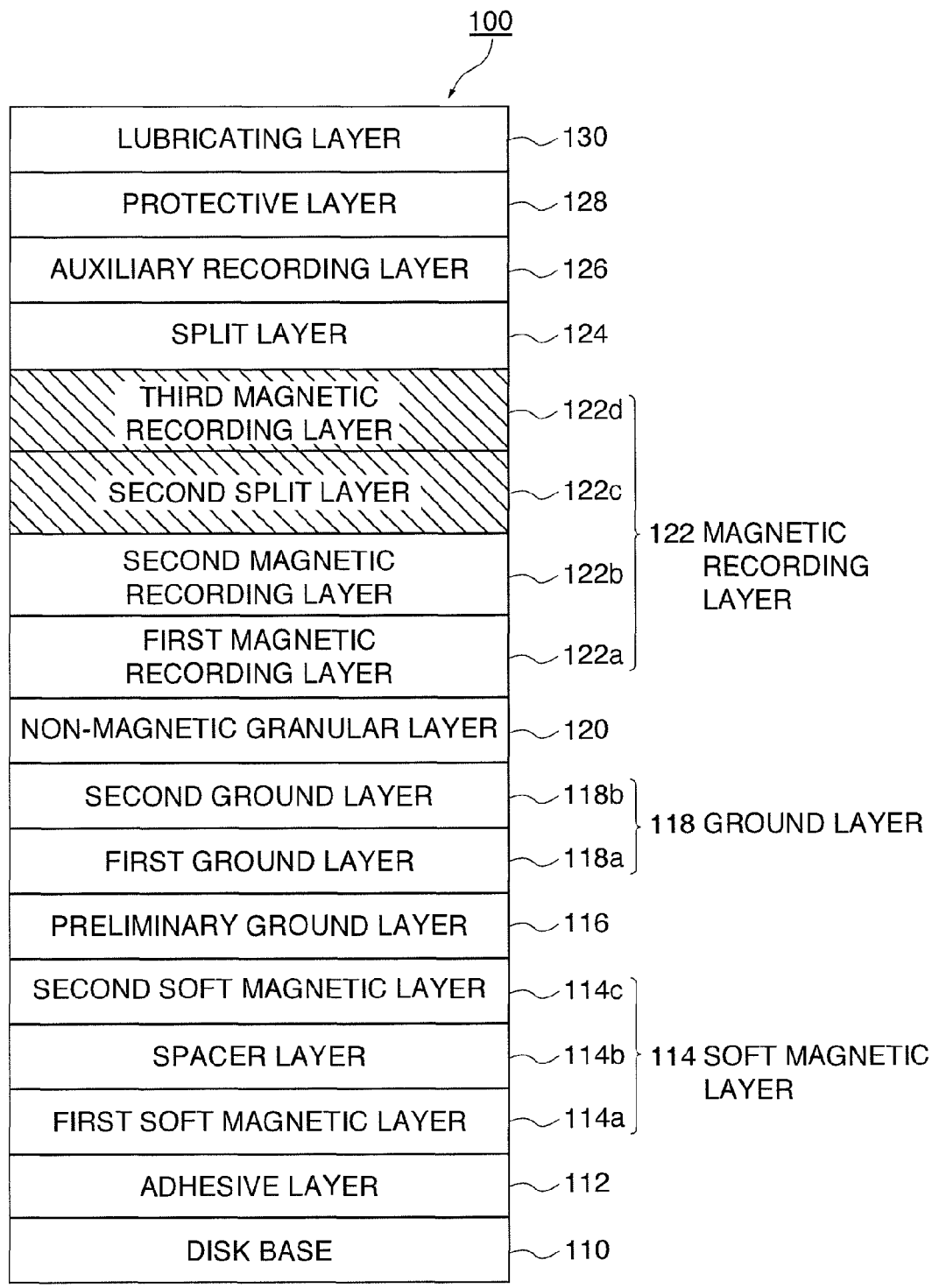
FIG. 7 is a diagram for describing the structure of a perpendicular magnetic recording medium according to a third embodiment.

FIG. 7 is a diagram showing a configuration of the perpendicular magnetic recording medium 100 according to the third embodiment. The perpendicular magnetic recording medium 100 according to the third embodiment has the same configuration as described in the first embodiment except for the magnetic recording layer 122 and the split layer 124. The magnetic recording layer 122 is composed of the first magnetic recording layer 122a, the second magnetic recording layer 122b, the second split layer 122c, and the third magnetic recording layer 122d.

The second split layer 122c is disposed on the second magnetic recording layer 122b, and contains a Ru alloy as a main component. The Ru alloy is an alloy obtained by adding another metal element to Ru, but the Ru alloy includes a Ru alloy containing oxygen or a Ru alloy to which an oxide is added. Specific examples are RuCo, $RuWO_3$, $RuTiO_2$, RuO, $RuSiO_2$, and the like. Furthermore, the second split layer 122c may be non-magnetic, or may be weakly magnetized. A specific example is $RuCO_{50}$. In particular, $RuCO_{50}$ is excellent for improving the SNR because it can cause Co to inherit the crystalline orientation from the magnetic recording layer toward the auxiliary recording layer.

The third magnetic recording layer 122d is disposed on the second split layer 122c, and has a columnar granular structure in which the grain boundary is formed by segregating non-magnetic substances around magnetic particles of a hard magnetic substance selected from a group consisting of Co alloy, Fe alloy, and Ni alloy, like the first magnetic recording layer 122a or the second magnetic recording layer 122b.

The split layer 124 is disposed on the third magnetic recording layer and immediately under the auxiliary recording layer 126. In the first embodiment, it has been described that the split layer 124 is "a non-magnetic layer containing Ru and oxygen", but in the present embodiment, the split layer 124 is made of a Ru alloy. The split layer 124 may or may not contain oxygen. The split layer 124 may be non-magnetic or may be weakly magnetized. Desired materials for the split layer 124 are the same as described for the second split layer 122c, but it is unnecessary for the material for the split layer 124 to coincide with the material as for the second split layer 122c.

According to the above configuration, first, the noise thought to be due to the auxiliary recording layer 126 can be reduced by the split layer 124 in the same manner as described above to improve the SNR. That is, not only in the case where the split layer 124 is composed of Ru and oxygen, but also in the case where the split layer 124 is composed of a Ru alloy, the SNR can be improved by the split layer 124 similarly.

The split layer 124 also has an effect of separating the crystal particles of the magnetic layer disposed thereon (see FIG. 4). This effect is also achieved by the second split layer 122c, so that separation of crystal particles of the third magnetic recording layer 122d is promoted. Therefore, the SNR in the magnetic recording layer provided with a granular structure can also be improved to achieve a higher recording density.

Here, the respective roles of the first to third magnetic recording layers all of which have a granular structure and differences between them will be sorted out. In the course of development, there was initially one magnetic recording layer having the granular structure. By the way, dominant factors that achieve a high recording density are a high SNR and a high coercive force Hc, but simply changing the composition or film thickness of the magnetic recording layer brings the SNR and the coercive force into such a relationship that, as the coercive force Hc increases, the noise increases to reduce the SNR. So, such a configuration was contrived that the magnetic recording layer was divided into two layers, a bottom magnetic recording layer of which (the first magnetic recording layer 122a) on a side more distant from the head increased the coercive force Hc, a top magnetic recording layer of which (the second magnetic recording layer 122b in the first embodiment) increased the SNR. Therefore, the first magnetic recording layer 122a that is a lowermost layer is made as a layer having high coercive force Hc by reducing the amount of oxide as compared with those of the other magnetic recording layers so that the size of magnetic particles increases.

This idea leads to the idea that the magnetic recording layer is formed to have a further multilayer structure such that the SNR is increased while the coercive force is gradually reduced. However, simply by changing the amount of oxide failed to achieve improvement in characteristic even in such a multilayered structure as three or more layers.

Then, as described above, the third magnetic recording layer 122d was added in such a manner as to divide the second magnetic recording layer 122b, and the second split layer 122c was disposed between them. Since the second split layer 122c promoted separation of the crystal particles of the third magnetic recording layer 122d, generally the SNR was significantly improved, and therefore it became possible to achieve a higher recording density.

Regarding the oxide, it is desired that the SNR of the third magnetic recording layer 122d be made higher than that of the second magnetic recording layer 122b, and therefore it is desired that the oxide content of the third magnetic recording layer 122d is equal to or slightly higher than that of the second magnetic recording layer 122b. Accordingly, it is preferred that the oxide contents of the first magnetic recording layer 122a, the second magnetic recording layer 122b, and the third magnetic recording layer 122d increase in this order. Regarding a material for the oxide, it is also desired that a higher layer contains an oxide with a higher SNR. Therefore, for example, it is preferred that the third magnetic recording layer 122d contain more $TiO_2$ than $SiO_2$. Note that it is known that $SiO_2$ promotes refinement of magnetic particles and $TiO_2$ improves an SNR.

Note that adding Co oxide is preferred for both the second magnetic recording layer 122b and the third magnetic recording layer 122d, because the SNR is further improved with no reduction in coercive force Hc. In the magnetic recording layer containing an oxide, an element that has become a single substance according to desorption of oxygen of the oxide tends to be incorporated into the magnetic particles. Such a phenomenon reduces the crystallinity and crystalline orientation of the magnetic particles, resulting in reduction in coercive force Hc. By the way, Co oxide has a large Gibbs free energy $\Delta G$, where Co ions and oxygen ions easily separate. Therefore, when Co oxide is added, oxygen is preferentially desorbed from the Co oxide, and oxygen loss occurring in the oxide contained in the magnetic recording layer can be compensated. Therefore, it becomes possible to prevent an element the oxide is composed of from being incorporated with the magnetic particles so that the crystallinity and crystalline orientation of the magnetic particles are improved.

Regarding the film thicknesses, it is preferred that the second magnetic recording layer 122b serving as a main recording layer be thickest and the first magnetic recording layer 122a for securing the coercive force be thin, and the third magnetic recording layer 122d for improving the SNR may also be thin. As a specific example, the first magnetic recording layer 122a can be set within the range of 1 to 3 nm, the second magnetic recording layer 122b can be set within the range of 7 to 9 nm, and the third magnetic recording layer 122d can be set within a range of 2 to 4 nm. If the first magnetic recording layer 122a is made thick, the noise increases to reduce a total SNR. If the third magnetic recording layer 122d is made thick, the noise does not increase so much as in the case of the first magnetic recording layer 122a but thickening the same provides no advantage, and spacing loss from the magnetic head to the soft magnetic layer 114 also increases to degrade the overwrite characteristic, and therefore it is desired that the third magnetic recording layer 122d be as thin as possible.

Furthermore, because the third magnetic recording layer 122d and the second magnetic recording layer 122b produce an exchange coupling magnetic interaction with each other via the second split layer 122c, magnetization reversal of the second magnetic recording layer 122b also becomes easy, so that such an effect that the overwrite characteristic is improved can be obtained.

Examples

In order to confirm effectiveness of the perpendicular magnetic recording layer 100 having the above configuration, explanation will be made using the following examples and comparative examples.

As examples, the adhesion layer 112 to the auxiliary recording layer 126 were sequentially formed on the disk base 110 in an Ar atmosphere by DC magnetron sputtering using an apparatus for film formation subjected to vacuuming. Note that an Ar gas pressure at a film formation time is 0.6

Pa unless otherwise specified. The adhesion layer 112 to the auxiliary recording layer 126 were sequentially formed on the disk base 110 in an Ar atmosphere by DC magnetron sputtering using an apparatus for film formation subjected to vacuuming. As the adhesion layer 112, a 10-nm-thick $CrTi_{50}$ film was formed. Regarding the soft magnetic layer 114, as the first soft magnetic layer 114a and the second soft magnetic layer 114c, 20-nm-thick $(CO_{60}Fe_{40})92-Ta3-Zr5$ films were formed, and, as the spacer layer 114b, a 0.5-nm-thick Ru film was formed. As the preliminary ground layer 116, a 7-nm-thick $NiW_5$ film was formed. As the first ground layer 118a, a 10-nm-thick Ru film was formed. As the second ground layer 118b, a 10-nm-thick Ru film was formed at 5 Pa. As the non-magnetic granular layer 120, a 1-nm-thick non-magnetic $(CoCr_{40})88-(SiO_2)$ 12 film was formed at 3 Pa. As the first magnetic recording layer 122a, a 2-nm-thick $(CoCr_{12}Pt_{18})$ 93-$(Cr_2O_3)$7 film was formed at 3 Pa. As the second magnetic recording layer 122b, an 8-nm-thick $(CoCr_{13}Pt_{16})90-(SiO_2)$ 4.5-$(TiO_2)$4.5-$(CO_3O_4)$1 film was formed. As the third magnetic recording layer 122d, a 3-nm-thick $(CoCr_{10}Pt_{16})89-(TiO_2)10-(CO_3O_4)$1 film was formed at 3 Pa. Regarding the second split layer 122c and the split layer 124, the following examples and comparative examples were produced and compared with each other. As the auxiliary recording layer 126, a 7-nm-thick $CO_{62}Cr_{18}Pt_{15}B_5$ film was formed. As the protective layer 128, a 5-nm-thick film was formed by CVD method using $C_2H_4$ and CN, and, as the lubricating layer 130, a 1.3-nm-thick film was formed by dip coating using PFPE.

FIG. 8 is a table illustrating comparisons of the split layer and the presence/absence of the second split layer and the materials thereof. An example 11 is an example of the perpendicular magnetic recording medium 100 provided with only the split layer 124. As the split layer 124, a $RuCO_{50}$ ($Ru_{50}CO_{50}$) metal layer having a film thickness of 3 Å was formed. An example 12 is an example provided with not only the split layer 124 identical with that of the example 11 but also the second split layer 122c. As the second split layer 122c, a $RuCO_{50}$ metal layer having a film thickness of 6 Å was formed. An example 13 is an example provided with only the split layer 124, where a layer containing an oxide of RuWO3 and having a film thickness of 3 Å was formed. An example 14 is an example where the second split layer was made of $RuCo_{40}$ and an example 15 is an example where the second split layer was made of $RuCO_{60}$, and except for the second split layers they were in the same condition as in the example 12. A comparative example 11 is an example provided with only the split layer 124 made of Ru as a single substance.

First, in comparison between the comparative example 11 and the example 13, the coercive force of the example 13 was higher and the SNR thereof was much more improved. As is the case in the first embodiment, it is thought from this that causing the split layer 124 to contain a lower percentage of oxygen content than the percentage of oxide Content of the magnetic recording layer 122 made it possible for the split layer 124 to work as a bridge between the grain boundary of the magnetic recording layer 122 containing a large amount of oxygen and the auxiliary recording layer 126 containing no oxygen.

Furthermore, in comparison between the example 13 and the example 11, the coercive force of the example 11 was higher and the SNR thereof was more improved. From this, it is thought that, while oxygen worked as a bridge between the grain boundaries in the example 13, Co worked as a bridge between the magnetic particles in the example 11. That is, since whether the magnetic layer exploits its characteristic depends on the condition of the magnetic particles, it is thought that it was more effective to condition the magnetic particles directly by Co than to condition the grain boundaries by oxygen to achieve indirect improvement.

Furthermore, in comparison between the example 11 and the example 12, it is found that the coercive force of the example 12 was slightly lowered but the SNR was much more improved. This proves that separation between the crystal particles of the third magnetic recording layer 122d was promoted. Besides, referring to the example 14 and the example 15, favorable characteristics similar to that of the example 12 (the case of $RuCO_{50}$) were obtained.

FIG. 9 is a table illustrating relationships between the film thicknesses of the split layer and the second split layer and the SNR. In FIG. 9, the film thickness of the split layer 124 was fixed at 0.5 nm (5 Å), and the film thickness of the second split layer 122c was changed. Note that a film thickness of 0 nm means that neither film is formed.

By referring to FIG. 9, it is found that a good SNR can be obtained when the film thickness is within the range of 0.4 to 1.0 nm. From this, it is found that, at least when the second split layer is made of $RuCO_{50}$, a favorable magnetic characteristic can be obtained within the range of film thicknesses of 0.4 nm to 1 nm. Note that, if the second split layer 122c becomes too thick, a magnetic coupling of the magnetic layers positioned above and below the second split layer is broken to reduce the SNR.

Figure 10:
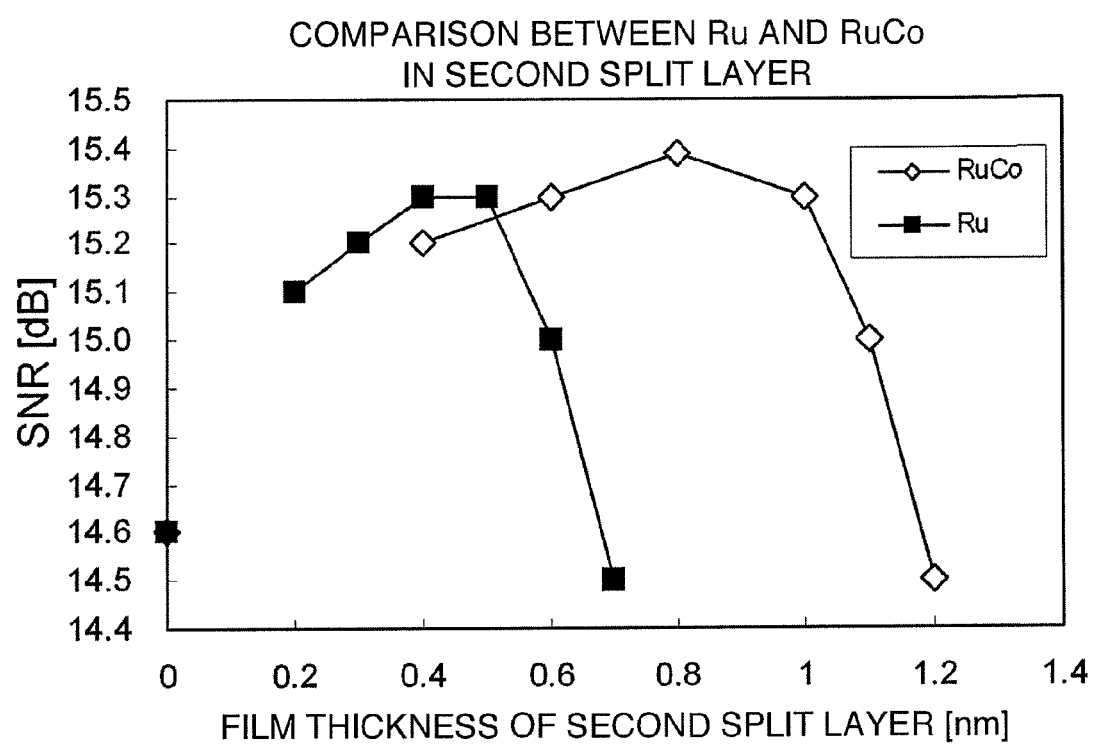
FIG. 10 is a graph for describing the relationship between film thicknesses of Ru and RuCo and SNR in a second split layer.

FIG. 10 is a graph illustrating the relationships between the film thicknesses of Ru and $RuCO_{50}$ in the second split layer 122c and the SNR. The peak value of the SNR of RuCo is slightly higher than that of Ru, but the important matters in this figure are the film thicknesses at the peak values. That is, Ru has a peak value of the SNR at a film thickness of about 0.45 nm, and then the value sharply lowers. On the other hand, RuCo has a peak value of the SNR at a film thickness of about 0.8 nm, and then the value less lowers sharply than Ru. That is, in a case where Ru is used as a material for the second split layer 122c, the SNR strongly depends on the film thickness, and only a 0.1-nm thickness error may cause significant deterioration of the characteristic. On the other hand, in a case where RuCo is used, the dependence of the SNR on the film thickness can be reduced, and therefore the production stability of the perpendicular magnetic recording medium is enhanced, so that the production efficiency thereof can be improved.

Fourth Embodiment

A fourth embodiment of the present invention will be described. The components that have already been described in the first to third embodiments are provided with the same reference numerals and are not redundantly described.

It is known that a carbon protective layer made by CVD method can be formed as a dense and hard coating film by elevating a substrate temperature. Therefore, for a conventional in-plane recording type magnetic disk, a process of performing heating before forming a protective layer was often employed. However, in a perpendicular magnetic recording medium, the heating process cannot be employed because such a characteristic as a coercive force Hc significantly deteriorates due to the heating, and therefore it was difficult to obtain a protective layer having a desired hardness. Here, it was previously unknown which layer of the perpendicular magnetic recording medium was damaged by heating.

The inventors of the present invention have examined the above problem hard, and have found that the deterioration of the characteristic due to heating the perpendicular magnetic recording medium depends on the amount of Cr in the auxiliary recording layer. Then, the inventors have determined that the characteristic deteriorates because Cr in the auxiliary recording layer affects the magnetic recording layer, have found out that the deterioration of the characteristic can be prevented by eliminating this effect even if heating is performed before the protective layer is formed, and have accumulated further studies and have reached completion of the present invention.

The perpendicular magnetic recording medium 100 of the fourth embodiment is generally the same as that described in the first embodiment. However, in the fourth embodiment, the split layer 124 disposed between the magnetic recording layer 122 (second magnetic recording layer 122b) and the auxiliary recording layer 126 is a non-magnetic thin film made of Ru or a Ru alloy. By providing the split layer 124 thus configured, diffusion of Cr between the magnetic recording layer 122 and the auxiliary recording layer 126 can be prevented even if the substrate is heated, so that reduction in coercive force Hc can be suppressed. That is, providing the split layer 124 makes it possible to heat the substrate before the protective layer is formed.

Furthermore, since the split layer 124 contains oxygen, the split layer 124 works as a magnetic and structural bridge when the split layer 124 is formed on the magnetic recording layer 122 containing a large amount of oxide and the auxiliary recording layer 126 containing no oxygen is formed on the split layer 124, and therefore the noise thought to be due to the auxiliary recording layer can be reduced to achieve the SNR.

Furthermore, regarding the protective layer 128, by performing heating before forming the protective layer to elevate Dh/Gh, a dense and hard protective layer 128 can be formed, so that impact resistance, abrasion resistance, corrosion resistance, and the like of the medium can be improved. Then, by disposing the split layer 124 between the magnetic recording layer 122 and the auxiliary recording layer 126, the substrate can be heated without reducing the coercive force Hc, so that the perpendicular magnetic recording medium having both the coercive force Hc and durability can be obtained.

Next, the split layer 124 and the protective layer 128, which are features of the present embodiment, will be described in further detail.

Figure 11:
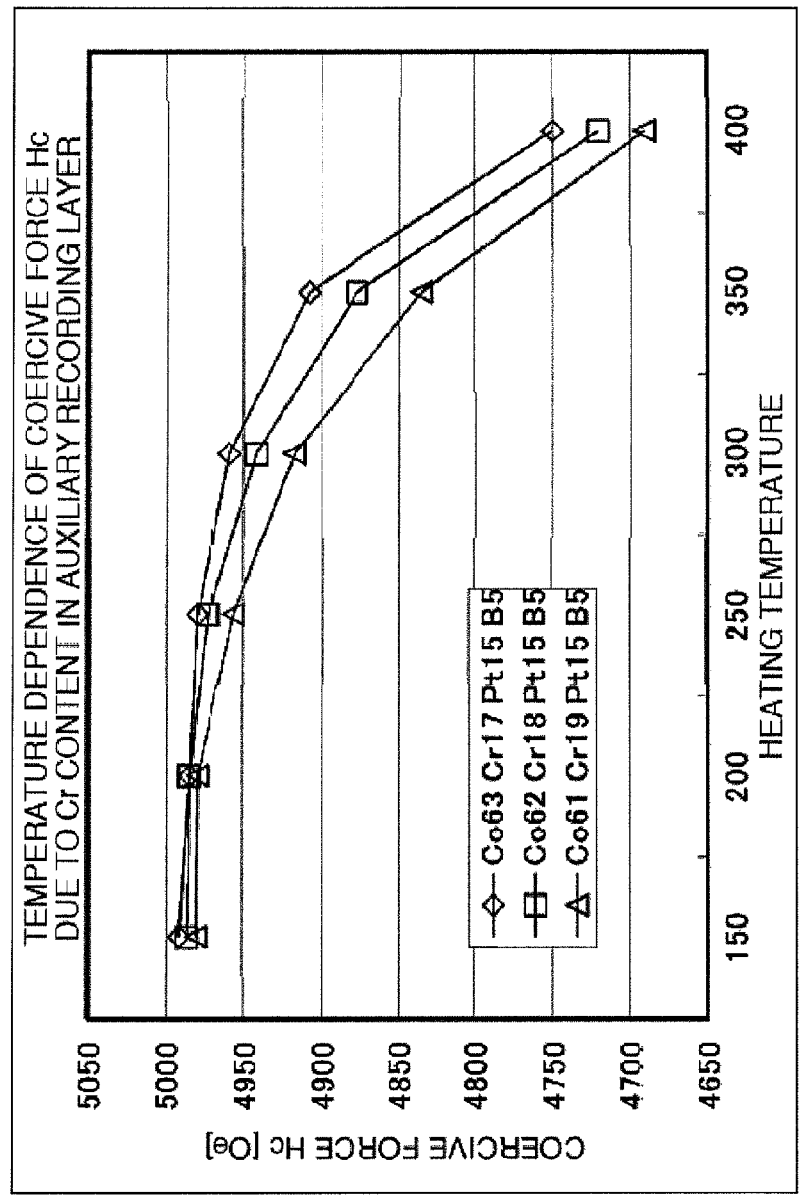
FIG. 11 is a diagram including a table and a graph, for describing temperature dependency of a coercive force Hc due to Cr content in an auxiliary recording layer when a split layer was not provided in a fourth embodiment.

FIG. 11 is a table and a graph illustrating temperature dependence of the coercive force Hc due to the Cr content in the auxiliary recording layer 126 in a case where the split layer is not provided. In FIG. 11, the auxiliary recording layers are made of CoCrPtB, the respective Cr contents of which are 17 mol %, 18 mol %, and 19 mol %, and the respective coercive forces Ho thereof are measured at temperatures in the range of 150° C. to 400° C. As can be seen from FIG. 11, it is found that heating at a higher temperature and a higher Cr content make the coercive force Ho lower. This may be because Cr diffuses between the magnetic recording layer 122 and the auxiliary recording layer 126 to disturb the crystalline orientation of the magnetic recording layer 122.

On the other hand, the split layer 124 described above is a non-magnetic layer containing RU and oxygen and disposed between the magnetic recording layer 122 and the auxiliary recording layer 126. Providing the split layer 124 thus configured makes it possible to prevent Cr from diffusing between the magnetic recording layer 122 and the auxiliary recording layer 126 so that the coercive force Hc can be prevented from being reduced even if the substrate is heated before the protective layer is formed. That is, providing the split layer 124 makes it possible to perform heating before forming the protective layer. Thereby, a peak ratio Dh/Gh according to a Raman spectrum of the protective layer 128 can be in a range from 0.70 to 0.95, so that impact resistance, abrasion resistance, corrosion resistance, and the like can be improved.

That is, the perpendicular magnetic recording medium according to the present embodiment includes, on a base, at least a magnetic recording layer having a granular structure in which a non-magnetic grain boundary is formed between crystal particles grown in a columnar shape; a non-magnetic split layer provided as an upper layer of the magnetic recording layer; an auxiliary recording layer provided as an upper layer of the split layer and being magnetically approximately continuous in an in-plane direction of a main surface of the base; a protective layer provided as an upper layer of the auxiliary recording layer and mainly composed of carbon; and a lubricating layer disposed on the protective layer. Regarding the protective layer, when the protective layer is excited by an argon ion laser with a wavelength of 514.5 nm to measure a Raman spectrum, fluorescent background in the range of wave number of the Raman spectrum of 900 to 1800 $cm^{-1}$ is corrected by linear approximation, and a D peak that appears at around 1350 $cm^{-1}$ and a G peak that appears at around 1520 $cm^{-1}$ are subjected to waveform separation by Gaussian function, the ratio of D peak height (Dh) to G peak height (Gh) is in a range from 0.70 to 0.95.

Paradoxically, even if the magnetic recording layer 122 and the auxiliary recording layer 126 are Co alloys containing Cr, reduction in coercive force Hc due to heating can be prevented by providing the split layer 124. By making the magnetic recording layer 122 and the auxiliary recording layer 126 from Co alloys containing Cr, magnetic films having high perpendicular magnetic anisotropy can be obtained as the magnetic recording layer 122 and the auxiliary recording layer 126. Therefore, it is possible to improve the high density recording property and low noise property of the magnetic recording layer 122. Furthermore, by disposing the auxiliary recording layer 126 above the magnetic recording layer 122, the perpendicular magnetic recording medium 100 can also be given high resistance to heat fluctuation.

The split layer 124 may be made of Ru or a Ru alloy. Because Ru has a crystalline form (hcp) similar to Co composing the magnetic particles, Ru is unlikely to disturb epitaxial growth of the Co crystal particles even if it intervenes between the magnetic recording layer 122 and the auxiliary recording layer 126.

The split layer 124 may also be made of Ru or a Ru alloy containing W (tungsten). By causing W to be contained, in particular, a reduction in coercive force Hc during heating at a high temperature is made small. It is thought that such a fact may be because W is a high-melting-point material, and therefore the crystalline structure thereof is difficult to collapse even by heating, and diffusion of Cr between the auxiliary recording layer 126 and the magnetic recording layer 122 can be prevented. In a case where the split layer is composed of Ru and an oxide, there are various possible oxides, in particular, by using an oxide of W, Ti, or Ru, the electromagnetic conversion characteristic (SNR) can be improved. Of them, $WO_3$ can obtain a high effect. It is thought that such a fact may be because $WO_3$ is an unstable oxide, and therefore oxygen is dissociated during sputtering, and the oxygen dissociated also exhibits the effect of oxygen addition. Other examples of oxides can include silicon oxide ($SiO_x$), chromium oxide ($Cr_xO_y$), titanium oxide ($TiO_2$), zircon oxide ($ZrO_2$), tantalum oxide ($Ta_2O_5$), iron oxide ($Fe_2O_3$), boron oxide ($B_2O_3$), and the like. A nitride such as BN or a carbide such as $B_4O_3$ can be used suitably.

Furthermore, by causing the split layer 124 described above to contain oxygen, the noise thought to be due to the auxiliary recording layer can be reduced to achieve improvement in SNR. It can be supposed that such a fact may be because a fine structure inherited from the magnetic recording layer 122 can be adjusted at a crystal growth time of the auxiliary recording layer 126, that is, causing the split layer 124 to contain a lower percentage of oxygen content than the percentage of oxide content of the magnetic recording layer 122 makes it possible for the split layer to work as a bridge between the grain boundary of the magnetic recording layer 122 containing a large amount of oxygen and the auxiliary recording layer 126 containing no oxygen. In a portion of the split layer 124 positioned on the magnetic particles of the magnetic recording layer 122, Ru causes Co of the auxiliary recording layer 126 to inherit the crystal structure of Co in the magnetic recording layer 122. In a portion of the split layer 124 positioned on the grain boundary of the magnetic recording layer 122, because oxygen and Ru forming the grain boundary are substantially different in lattice constant from each other, inheritance of the crystalline orientation does not occur, but RU and oxygen atoms freely migrate to form a coating film (crystal). Since the auxiliary recording layer 126 is formed on the crystal of Ru, separation of the Co particles in the auxiliary recording layer 126 is further promoted to achieve noise reduction. Therefore, the crystalline orientation of the auxiliary recording layer 126 is improved as a whole.

When Ru is caused to contain oxygen in the split layer 124, there are a method of causing a target to contain oxygen in advance and a reactive sputtering that oxygen is added to atmosphere gas during sputtering. Above all, it is preferred that the split layer 124 is subjected to the sputtering using a target made of Ru and oxygen, because oxygen can be caused to be contained evenly in the whole of the film.

On the other hand, it is preferred that the split layer 124 contains no Cr. This is because, when the split layer 124 contains Cr, reduction in coercive force Hc due to heating can be seen. It is thought that such a fact is because Cr of the split layer 124 diffuses in the magnetic recording layer 122 to affect the crystalline orientation.

Figure 12:
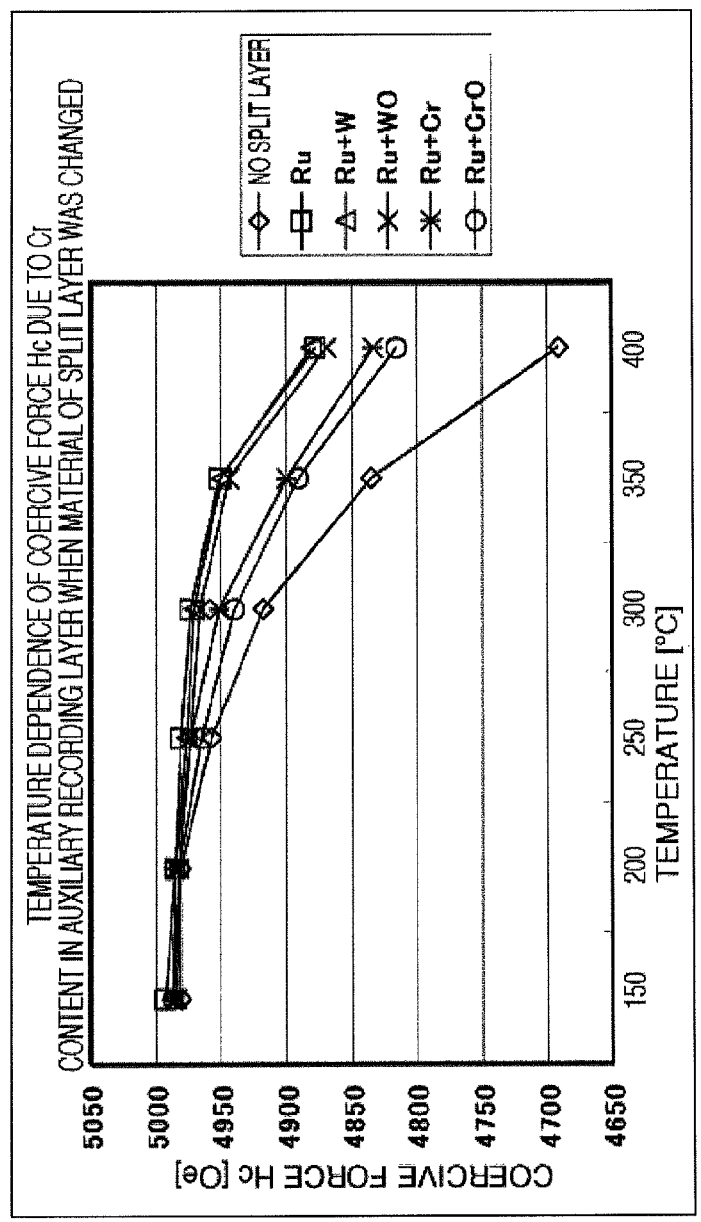
FIG. 12 is a diagram including a table and a graph, for describing temperature dependency of a coercive force Hc due to Cr content in an auxiliary recording layer when a material for a split layer was varied.

FIG. 12 shows a table and a graph illustrating temperature dependence of the coercive force Hc due to the Cr content in the auxiliary recording layer 126 in a case where the material of the split layer 124 is changed. The auxiliary recording layer 126 is made of $CO_{61}Cr_{19}Pt_{15}B_5$ in all cases. In FIG. 12, regarding the material of the split layer, in a case where the split layer is not provided and in cases where the materials of the split layers 124 are Ru, Ru+W, Ru+WO, Ru+Cr, and Ru+CrO, the respective coercive forces Hc are measured while the temperature is changed from 150° C. to 400° C.

As can be seen from FIG. 12, it can be found that, in the cases where the split layer 124 is provided, as compared with in the case where the split layer is not provided, the coercive force Hc can remarkably be kept equal to or more than 4800 [Oe]. Note that, at present, a coercive force Hc is required to be 4800 [Oe] or more for a perpendicular magnetic recording medium. It is thought that the result is because diffusion of Cr between the magnetic recording layer 122 and the auxiliary recording layer 126 could be prevented.

However, among the cases where the split layer 124 is provided, the split layer 124 made of a material containing Cr, such as Ru+Cr or Ru+CrO, causes a large reduction in coercive force Hc. It is thought that such a fact is because Cr in the split layer 124 diffuses in the magnetic recording layer 122.

In all the cases where the split layer contains no Cr, the coercive forces Hc can be kept to a similar extent, and even in the case of heating at a temperature of 400° C., the coercive forces Hc equal to or more than 4850 [Oe] are maintained. Above all, the split layer containing WO can keep the coercive force Hc high. It is thought that such a fact is because W is a high-melting-point material, and therefore the crystalline structure thereof is difficult to collapse even by heating, and diffusion of Cr between the auxiliary recording layer 126 and the magnetic recording layer 122 can be prevented.

The split layer 124 may have a film thickness of 2 Å to 10 Å (0.2 nm to 1 nm). By adopting such a thin film, the split layer 124 does not form a complete film, and therefore the inheritance of the crystalline orientation from the crystal particles of the magnetic recording layer 122 to the auxiliary recording layer 126 is not disconnected. If the film thickness of the split layer 124 is 10 Å or more, the magnetic recording layer 122 and the auxiliary recording layer 126 are magnetically completely discontinued, and therefore a desired electromagnetic conversion characteristic cannot be obtained. On the other hand, if the film thickness is 2 Å or less, the split layer 124 cannot form a coating film.

The protective layer 128 is a coating film mainly composed of carbon and containing nitrogen, where the ratio of atomic weight of nitrogen to carbon (N/C) in a topmost surface of the protective layer 128 may be in the range of 0.050 to 0.150. In this manner, setting the ratio of atomic weight of nitrogen to carbon (N/C) in the range of 0.050 to 0.150 makes it possible to increase the ratio of adhesion to the lubricating layer 130, a high fly write problem or a crash against the magnetic head can be avoided.

Heating before forming the protective layer may be performed at a temperature in the range of 250° C. to 350° C. When a heating process is performed immediately before forming the protective layer, carbon atoms decomposed by plasma can reach the substrate, keeping high energy. These carbon atoms keeping high energy form a film on the substrate on the auxiliary recording layer 126, and thus the protective layer 128 that is dense and durable can be formed. Furthermore, by heating the auxiliary recording layer 126 at a high temperature, adhesion between the auxiliary recording layer 126 and the protective layer 128 is also improved.

After forming the protective layer 128, by further exposing the protective layer 128 to nitrogen atmosphere at a flow rate of 100 sccm to 350 sccm, a process may be performed such that the ratio (N/C) of atomic weight of nitrogen (N) to carbon (C) on the surface of the protective layer 128 is in a range from 0.050 to 0.150. By exposing the protective layer 128 to nitrogen atmosphere at a flow rate of 100 to 350 sccm, the ratio (N/C) of atomic weight of nitrogen (N) to carbon (C) can be put in a range from 0.050 to 0.150, and an adhesion of the protective layer 128 to the lubricating layer 130 and a hardness thereof can be made suitable.

Furthermore, the lubricating layer 130 containing a perfluoro polyether compound having a hydroxyl group as a terminal group may be formed. Perfluoro ether has a straight-chain structure, and it provides a moderate lubrication performance for the perpendicular magnetic recording medium, and can provide high adhesion to the protective layer 128 because it has the hydroxyl (OH) as the terminal group. Particularly in the configuration of the present invention provided with a surface treatment layer containing nitrogen on the surface of the protective layer 128, ($N^+$) and ($OH^-$) have a high affinity for each other, and therefore the lubricating layer can obtain a high adhesion rate.

Examples

FIG. 13 is an explanatory table showing parameters and effectiveness of examples and comparative examples. Here, 13 examples (examples 21 to 33) and 8 examples (comparative examples 21 to 28) were shown, and the respective examples and comparative examples were subjected to an LUL durability test, a pin-on-disk test, and a high fly write test, and the effectiveness of each of the examples and the comparative examples was evaluated.

First, the configuration of the example 21 will be described.

The adhesion layer 112 to the auxiliary recording layer 126 were sequentially formed on the disk base 110 in an Ar atmosphere by DC magnetron sputtering using an apparatus for film formation subjected to vacuuming. Note that an Ar gas pressure at a film formation time is 0.6 Pa unless otherwise specified. As the adhesion layer 112, a 10-nm-thick $CrTi_{50}$ film was formed. Regarding the soft magnetic layer 114, as the first soft magnetic layer 114a and the second soft magnetic layer 114c, 20-nm-thick $(CO_{60}Fe_{40})92$-Ta3-Zr5 films were formed, and, as the spacer layer 114b, a 0.5-nm-thick Ru film was formed. As the preliminary ground layer 116, a 7-nm-thick $NiW_5$ film was formed. As the first ground layer 118a, a 10-nm-thick Ru film was formed. As the second ground layer 118b, a 10-nm-thick Ru film was formed at 5 Pa. As the non-magnetic granular layer 120, a 1-nm-thick non-magnetic $(CoCr_{40})88$-$(SiO_2)12$ film was formed at 3 Pa. As the first magnetic recording layer 122a, a 2-nm-thick $(CoCr_{12}Pt_{18})93$-$(Cr_2O_3)7$ film was formed at 3 Pa. As the second magnetic recording layer 122b, a 10-nm-thick $(CO_{71}Cr_{13}Pt_{16})90$-$(SiO_2)5$-$(TiO_2)5$ film was formed at 3 Pa.

As the split layer 124, a 0.3-nm (3 Å)-thick Ru—$(WO_3)14$ film was formed. As the auxiliary recording layer 126, a 7-nm-thick $CO_{62}Cr_{18}Pt_{15}B_5$ was formed.

Then, the surface of the perpendicular magnetic recording disk 100 after the auxiliary recording layer 126 was formed was heated. A PTC heater was used for heating. The heating period was about five seconds. Note that the temperature of the substrate of the perpendicular magnetic recording disk 100 was confirmed immediately after formation of the magnetic layer by using a radiation thermometer through a window of a chamber.

As the protective layer 128, a 5-nm-thick film was formed by CVD method using $C_2H_4$ and CN, and the lubricating layer 130 was formed by dip coating using PFPE.

Furthermore, on the disk after formation up to the magnetic recording layer 122 was made, the protective layer 128 was formed by plasma CVD method introducing 250 sccm of ethylene gas and applying a bias voltage in a switching manner between −300 V and −400 V under a pressure having a degree of vacuum of 1 Pa. The rate of film formation at a formation time of the protective layer 128 was 1 nm/sec.

Furthermore, after formation of the protective layer 128, only 250 sccm of nitrogen gas was introduced into plasma, and the protective layer 128 was exposed to nitrogen atmosphere under a pressure adjusted to a degree of vacuum of 3 Pa. In this manner, a process of impregnating the surface of the protective layer 128 with nitrogen was performed.

After formation up to the protective layer 128 was made, the film thickness of the protective layer 128 was measured by cross-section observation through a transmission electron microscope (TEM). As a result, the film thickness of the protective layer 128 was 3.0 nm.

Furthermore, after the protective layer 128 was formed, the ratio of atomic weight of nitrogen to carbon (N/C) in the protective layer 128 was confirmed by ESCA, and as a result the value was 0.107. The measurement conditions of this ESCA analysis were as follows:
Device: Quantum 2000 manufactured by ULVAC-PHI, Inc.
Source of X-ray excitation: Al—Kα ray (1486.6 eV)
X-ray source: 20 W
Degree of vacuum of analysis chamber: $<2\times10^{-7}$ Pa
Pass energy: 117.5 eV
Photoelectron detection angle: 45°
Measurement object peak: C1s, N1s
Analyzed area: 100 μmφ
Cumulated number: 10 times Furthermore, after the protective layer 128 was formed, Raman spectroscopic analysis was performed, and as a result the value of Dh/Gh was 0.80.

Note that the Raman spectroscopic analysis was performed by irradiating the surface of the protective layer 128 with an Ar ion laser having a wavelength of 514.5 nm, and observing a Raman spectrum due to Raman scattering that appears in the range of frequency of 900 $cm^{-1}$ to 1800 $cm^{-1}$.

Figure 14:
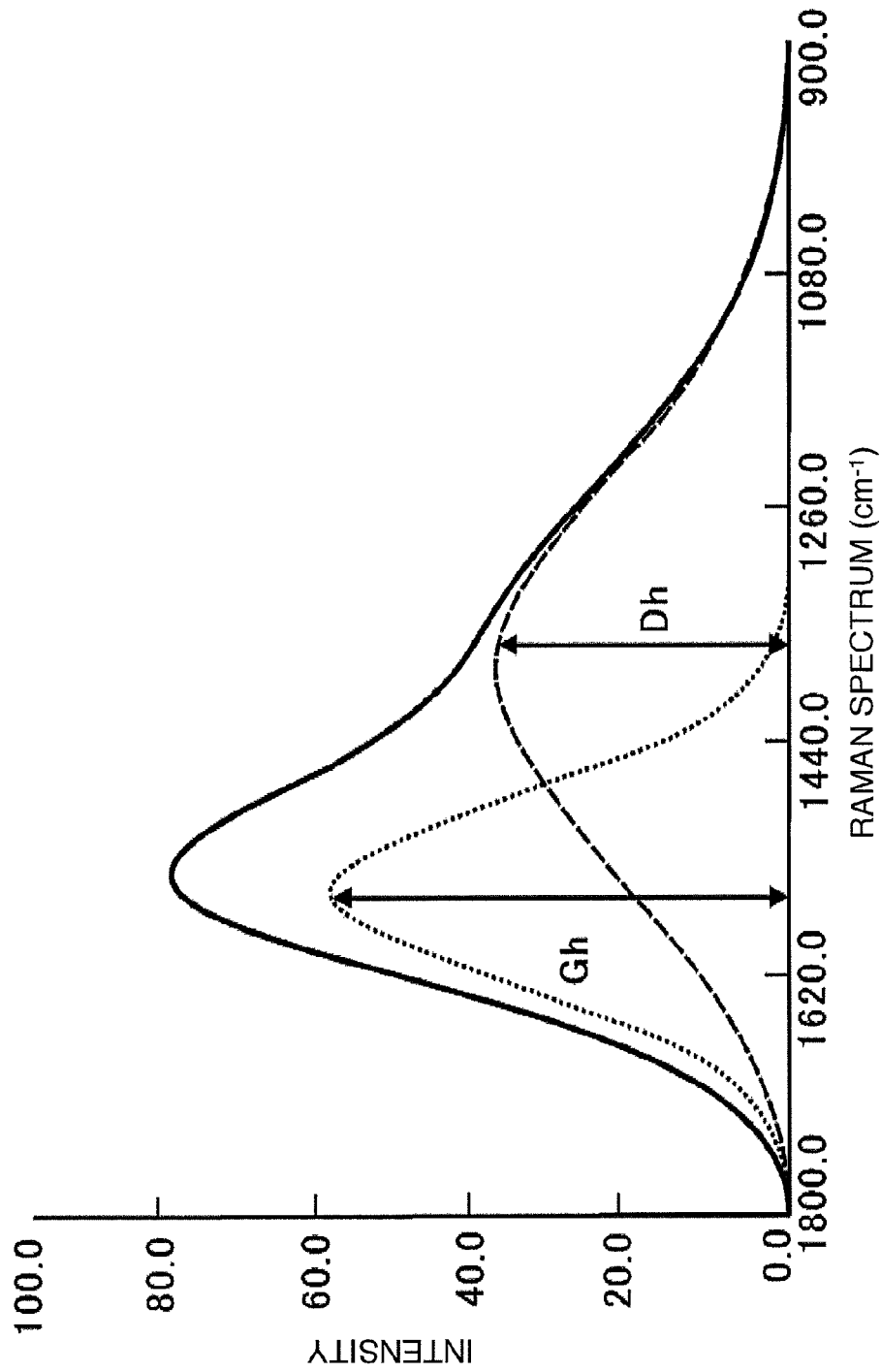
FIG. 14 is a graph for describing an image of Raman spectrum.

FIG. 14 is an explanatory graph illustrating an image of a Raman spectrum. Here, in the range of frequency of 900 $cm^{-1}$ to 1800 $cm^{-1}$ of a Raman spectrum, a fluorescent background is corrected by linear approximation, and the ratio Dh/Gh of D peak height to G peak height was obtained.

Generally, Raman spectroscopic analysis is performed before application of the lubricating layer 130, but measurement may be performed after application of a lubricant agent. When Raman spectroscopic analysis was performed before and after application of the lubricant agent, exactly the same value of Dh/Gh was obtained before and after that, and therefore it was clarified that a perfluoro polyether lubricant layer having a hydroxyl group as a terminal group did not affect Raman spectroscopic analysis.

After the protective layer 128 was formed, the protective layer 128 was subjected to immersion cleaning for 400 seconds in pure water at 70° C., then cleaned with IPA for 400 seconds, and dried with IPA vapor for finish drying.

Next, on the protective layer 128 after cleaned with ultrapure water and IPA, a lubricating layer 130 made of a PFPE (perfluoro polyether) compound was formed by dipping. Specifically, an alcohol denatured FOMBLIN Z derivative produced by AUSIMONT S.p.A was used. This compound is such that each end of a main chain of PFPE is provided with one or two hydroxyl groups, that is, a terminal group is provided with two to four hydroxyl groups per molecule. The film thickness of the lubricating layer 130 was 1.4 nm.

Regarding the perpendicular magnetic recording disk 100 thus produced, the surface roughness thereof was observed by an AFM, and it was confirmed that the surface thereof was a smooth surface having a maximum roughness Rmax of 2.30 nm and an average roughness Ra of 0.22 nm. Furthermore, when the glide height of the perpendicular magnetic recording disk 100 was measured, it was 3.2 nm. In order to achieve the flying height of the magnetic head of 10 nm or less stably, it is preferred that the glide height of the perpendicular magnetic recording disk 100 be 4.0 nm or less.

Evaluation analysis of various properties of the perpendicular magnetic recording disk 100 thus obtained was performed in the following manner.

(LUL Durability Test)

The LUL durability test was performed by using a 2.5-inch HDD that rotates at 5400 rpm and a magnetic head having a flying height of 10 nm. Note that, as a slider of the magnetic head, an NPAB (negative pressure air bearing) slider was used, and, as a reproducing device, a TMR element equipped with a DFH mechanism was used. The perpendicular magnetic recording disk 100 was mounted on this HDD, and the LUL operation was continuously performed by the above magnetic head.

Then, the LUL durability of the perpendicular magnetic recording disk 100 was evaluated by measuring the number of LUL operations where the HDD could keep performing without crashing. The test environment was 70° C./80% RH. This condition is more severe than a normal HDD driving environment, but, this is because the endurance reliability of the perpendicular magnetic recording disk 100 is more accurately determined by performing the test on the assumption that the HDD is used for a car navigation system or the like.

In such an LUL durability test, the perpendicular magnetic recording disks 100 of the examples 21 to 33 achieved the LUL operations more than a million times without crashing. Normally, in an LUL durability test, a test object is required to achieve LUL operations continuously 400,000 times without crashing. The 400,000-time LUL operation corresponds approximately to a ten-year usage in a normal HDD usage environment.

(Pin-on-Disk Test)

The Pin-on-disk test was performed in the following manner. That is, in order to evaluate the durability and abrasion resistance of the protective layer 128, the perpendicular magnetic recording disk 100 was rotated with a ball with a diameter of 2 mm made of $Al_2O_3$—TiC pressed onto the protective layer 128 under a load of 15 g at a location of a radius of 22 mm of this perpendicular magnetic recording medium, such that the $Al_2O_3$—TiC ball and the protective layer 128 cause relative rotating slide at a rate of 2 m/sec, and the number of slides until the protective layer 128 was broken by the sliding was measured.

In this pin-on-disk test, the perpendicular magnetic recording disk that took 300 or more slides until the protective layer 128 was broken was passed. Note that normally the magnetic recording head is not brought into contact with the perpendicular magnetic recording disk 100, and therefore this pin-on-disk test assumes a more severe environment than an actual usage environment. For example, the perpendicular magnetic recording disk 100 of the example 21 took 501 slides, and the other examples also took more than 300 slides.

(High Fly Write Test)

The high fly write test was performed in the following manner. A 2.5-inch HDD that rotates at 5400 rpm and a magnetic head having a flying height of 10 nm were used. Furthermore, as a slider of the magnetic head, an NPAB (negative pressure air bearing) slider was used, and as a reproducing device, a TMR element equipped with a DFH mechanism was used. The perpendicular magnetic recording disk 100 was mounted on this HDD, the DFH mechanism was caused to operate, and the head element was caused to generate heat. The heat caused thermal expansion of the magnetic head, the magnetic head protruded by 2 nm in an ABS direction, in this state recording and reproducing were performed for 1000 hours, and then whether or not an error failure occurred was examined. As a result, an error did not occur during 1000-hour recording and reproducing of the examples 21 to 33.

In the same manner as for the above examples, the comparative examples were subjected to the LUL durability test, pin-on-disk test, and high fly write test.

For example, for the comparative example 21, a perpendicular magnetic recording disk was formed in the same manner as for the example 21, except that the protective layer 128 was exposed to 90 sccm of nitrogen gas. However, because the amount of nitrogen introduced was too small, an error whereby recording and reproducing could not be performed occurred 12 hours later in the high fly write test.

Furthermore, in the comparative example 22, since the protective layer 128 was exposed to 360 sccm of nitrogen gas, the amount of nitrogen introduced was too large to reach standardized 300 slides in the pin-on-disk test, and besides, in the LUL test, the perpendicular magnetic recording disk got a scratch and crashed at 300,000 LUL operations. Also in the other comparative examples, it can be seen that one or more parameters different from those of the examples or the parameters outside predetermined ranges caused the comparative examples to fail to pass at least one of the LUL durability test, pin-on-disk test, and high fly write test.

Figure 15:
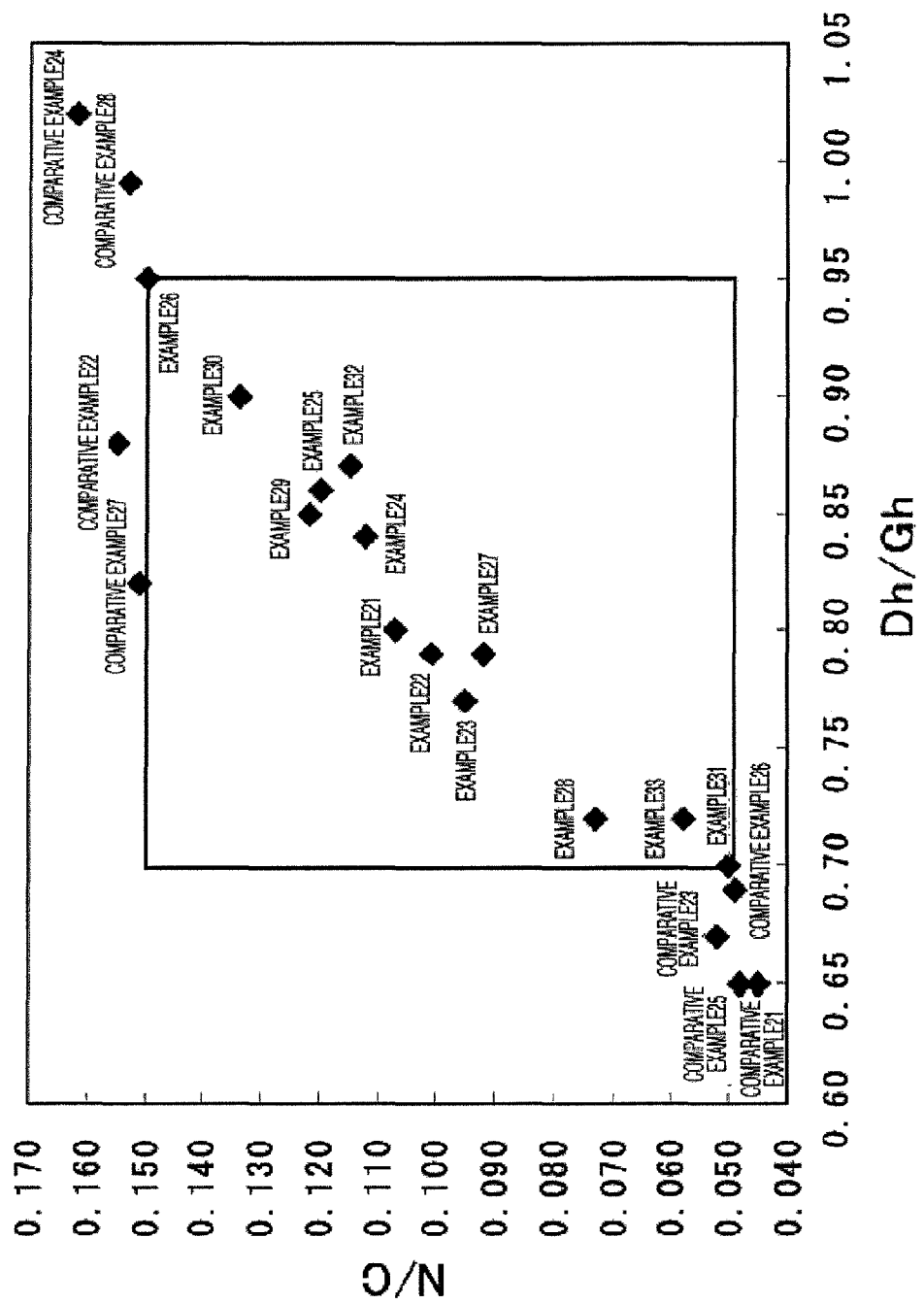
FIG. 15 is a plot graph where examples and comparative examples were plotted regarding N/C and Dh/Gh

FIG. 15 is a plot graph obtained by plotting the respective N/C and Dh/Gh of the examples and comparative examples. As can be seen by referring to the examples that are within the ranges of N/C of 0.050 to 0.150 and Dh/Gh of 0.70 to 0.95, and the comparative examples that are outside these ranges, the perpendicular magnetic recording disk 100 according to the present embodiment can also be applied to a DFH head, and can avoid a high fly write error even if the film thickness of the protective layer is 3 nm or less, and it also has a good abrasion resistance and sliding characteristic. It is obvious that the perpendicular magnetic recording disk 100 according to the present embodiment can also be applied to an LUL-type HDD.

As described above, according to the present invention, the noise thought to be due to the auxiliary recording layer can be reduced to achieve improvement in SNR. This makes it possible to achieve a higher recording density of the perpendicular magnetic recording medium 100.

Hereinabove, the preferred embodiments of the present invention have been described with reference to the appended drawings. Needless to say, however, the present invention is not restricted by these embodiments. It is clear that the person skilled in the art can conceive various modifications or variations within the scope of claims for patent, and it should be understood that these modifications belong to the technical scope of the present invention.

INDUSTRIAL APPLICABILITY

The present invention can be utilized as a perpendicular magnetic recording medium to be mounted on an HDD or the like of a perpendicular magnetic recording type and as a method of manufacturing the same.

The invention claimed is:

1. A perpendicular magnetic recording medium, comprising in the following order:
   a base;
   a first magnetic recording layer having a granular structure in which a non-magnetic grain boundary portion is formed between crystal particles grown in a columnar shape;
   a second magnetic recording layer having a granular structure in which a non-magnetic grain boundary portion is formed between crystal particles grown in a columnar shape;
   a second split layer that is disposed on the second magnetic recording layer and that contains a Ru alloy as a main component and;
   a third magnetic recording layer having a granular structure in which a non-magnetic grain boundary portion is formed between crystal particles grown in a columnar shape;
   a first split layer that is disposed on the third magnetic recording layer and that contains a Ru alloy as a main component; and
   an auxiliary recording layer that contains Cr, that is disposed on the split layer and that is magnetically approximately continuous in an in-plane direction of a main surface of the base,
   wherein the first split layer is operative to reduce the migration of Cr from the auxiliary layer into the third magnetic layer upon anneal at 200 C or higher, as indicated by a reduced drop in coercivity (Oe) compared to an identical structure absent the first split layer.

2. The perpendicular magnetic recording medium according to claim 1, wherein the first split layer contains Ru and an oxide.

3. The perpendicular magnetic recording medium according to claim 2, wherein the oxide is $WO_3$, $TiO_2$, or RuO.

4. The perpendicular magnetic recording medium according to claim 1, wherein the first split layer is in a range of 2 Å to 10 Å in film thickness.

5. The perpendicular magnetic recording medium according to claim 1, wherein at least one of the first magnetic recording layer, the second magnetic recording layer, and the third magnetic recording layer contains two or more kinds of oxide.

6. The perpendicular magnetic recording medium according to claim 1, wherein at least one of the first magnetic recording layer, the second magnetic recording layer, and the third magnetic recording layer contains $SiO_2$ and $TiO_2$ as oxides.

7. The perpendicular magnetic recording medium according to claim 1, wherein at least one of the first magnetic recording layer, the second magnetic recording layer, and the third magnetic recording layer contains 5 mol % or more of oxide composing the grain boundary.

8. The perpendicular magnetic recording medium according to claim 1, wherein the first magnetic recording layer contains 16 at % to 22 at % of Pt.

9. The perpendicular magnetic recording medium according to claim 1, wherein the second magnetic recording layer contains 14 at % to 19 at % of Pt.

10. The perpendicular magnetic recording medium according to claim 1, wherein, when the thickness of the first magnetic recording layer is represented by A nm and the thickness of the second magnetic recording layer is represented by B nm, A/B=15% -30%.

11. The perpendicular magnetic recording medium according to claim 1, wherein the first split layer or the second split layer contains RuCo as a main component.

12. The perpendicular magnetic recording medium according to claim 1, wherein at least one of the first split layer or the second split layer is in a range of 2 Å to 10 Å in film thickness.

13. The perpendicular magnetic recording medium according to claim 1, wherein an oxide content of the first magnetic recording layer, the second magnetic recording layer and the third magnetic recording layer increase in this order.

* * * * *